(12) United States Patent
Bando

(10) Patent No.: US 8,079,895 B2
(45) Date of Patent: Dec. 20, 2011

(54) GLASS-PLATE WORKING APPARATUS

(75) Inventor: Kazuaki Bando, Tokushima (JP)

(73) Assignee: Bando Kiko Co., Ltd., Tokushima-shi (JP)

( * ) Notice: Subject to any disclaimer, the term of this patent is extended or adjusted under 35 U.S.C. 154(b) by 0 days.

(21) Appl. No.: 10/529,384

(22) PCT Filed: Oct. 11, 2002

(86) PCT No.: PCT/JP02/10594
§ 371 (c)(1),
(2), (4) Date: Mar. 28, 2005

(87) PCT Pub. No.: WO2004/033149
PCT Pub. Date: Apr. 22, 2004

(65) Prior Publication Data
US 2006/0128281 A1    Jun. 15, 2006

(51) Int. Cl.
*B24B 9/00* (2006.01)
(52) U.S. Cl. ............. 451/255; 451/12; 451/41; 451/67; 451/70
(58) Field of Classification Search ............... 451/12, 451/41, 44, 70, 67, 255
See application file for complete search history.

(56) References Cited

U.S. PATENT DOCUMENTS

| | | | | |
|---|---|---|---|---|
| 4,809,425 A | * | 3/1989 | Monforte | 483/1 |
| 4,848,005 A | * | 7/1989 | Ercole et al. | 33/568 |
| 5,364,083 A | * | 11/1994 | Ross et al. | 269/21 |
| 5,396,736 A | * | 3/1995 | Bando | 451/5 |
| 5,433,657 A | * | 7/1995 | Bovone | 451/388 |
| 5,625,959 A | * | 5/1997 | Ercole et al. | 33/568 |
| 6,068,547 A | * | 5/2000 | Lupi | 451/388 |
| 2002/0021953 A1 | * | 2/2002 | Isogai et al. | 414/222.05 |
| 2003/0115906 A1 | | 6/2003 | Bando | |

FOREIGN PATENT DOCUMENTS

| | | |
|---|---|---|
| EP | 0 589 175 A1 | 3/1994 |
| JP | 06-024778 | 2/1994 |
| JP | 06-198531 | 7/1994 |
| JP | 6-198531 A | 7/1994 |
| JP | 09-263417 | 10/1997 |
| JP | 9-263417 A | 10/1997 |
| JP | 2001-261358 | 9/2001 |
| JP | 2001-261358 A | 9/2001 |
| JP | 2003-238179 | 8/2003 |

* cited by examiner

*Primary Examiner* — Robert Scruggs
(74) *Attorney, Agent, or Firm* — Nixon & Vanderhye P.C.

(57) ABSTRACT

A glass-plate working apparatus (1) includes a grinding means (7) for grinding a peripheral edge (6) of a glass plate (2); and a grinding supporting means (9) for supporting the glass plate (2) whose peripheral edge (6) is to be ground by the grinding means (7), wherein the grinding supporting means (9) includes a grinding supporting table (101), a plurality of suction cups (102) which are held on the grinding supporting table (101) by being attached by suction to the grinding supporting table (101) and suck and hold the glass plate (2) by sucking the glass plate (2) whose peripheral edge (6) is to be ground, and an arranging means (103) for disposing the plurality of suction cups (102), respectively, at positions corresponding to the shape of the glass plate (2) to be ground.

6 Claims, 12 Drawing Sheets

GLASS-PLATE WORKING APPARATUS

This application is the U.S. national phase of international application PCT/JP02/10594 filed 11 Oct. 2002 which designated the U.S., the entire content of which is hereby incorporated by reference.

TECHNICAL FIELD

The present invention relates to an apparatus for working a glass plate which is used as automobile window glass or the like.

BACKGROUND ART

In a working apparatus for manufacturing a glass plate having a desired shape by bend-breaking a glass plate, a grinding device is generally provided for grinding a peripheral edge of the bend-broken glass plate. This grinding device is so adapted as to suck and fix the bend-broken glass plate by a suction cup or the like and to grind the peripheral edge of this fixed glass plate.

In a case where the peripheral edge of the glass plate is ground, it is desirable to securely fix its vicinity, but it is difficult to do so with respect to various glass plates of different shapes with a single suction cup.

Accordingly, a glass-plate grinding device such as the one disclosed in, for example, JP-A-6-24778 has been proposed.

In the proposed glass-plate grinding device, a plurality of suction cups are moved in an X direction and a Y direction perpendicular to the X direction by using an X-direction moving device having a frame extending in the X direction and a Y-direction moving device having a frame extending in the Y direction so as to be disposed at positions suitable for sucking and holding in correspondence with the shape of the glass plate.

However, with such a glass-plate working apparatus, since the suction cups are provided on a base by means of a frame and the like and are restrained by the frame and the like, there is a possibility that the frame and the like may interfere with each other and make it impossible to arrange the suction cups at arbitrary positions. Hence, there is a possibility that it becomes impossible to arrange the respective suction cups at suitable positions corresponding to the shape of the glass plate.

The present invention has been devised in view of the above-described aspects, and its object is to provide a glass-plate working apparatus which makes it possible to arrange the suction cups at optimal positions for sucking and fixing the glass plate with respect to the respective shape of the glass plate.

DISCLOSURE OF THE INVENTION

The glass-plate working apparatus in accordance with a first aspect of the invention comprises: grinding means for grinding a peripheral edge of a glass plate; and grinding supporting means for supporting the glass plate whose peripheral edge is to be ground by the grinding means, wherein the grinding supporting means includes a grinding supporting table, a plurality of suction cups which are held on the grinding supporting table by being attached by suction to the grinding supporting table and suck and hold the glass plate by sucking the glass plate whose peripheral edge is to be ground, and arranging means for disposing the plurality of suction cups, respectively, at positions corresponding to a shape of the glass plate to be ground.

The glass-plate working apparatus in accordance with a second aspect of the invention comprises: bend-breaking means for forming a cut line on a glass plate and for bend-breaking the glass plate by press-breaking along the cut line the glass plate with the cut line formed thereon; grinding means for grinding a peripheral edge of the glass plate bend-broken by the bend-breaking means; bend-breaking supporting means for supporting the glass plate to be bend-broken by the bend-breaking means; grinding supporting means for supporting the glass plate whose peripheral edge is to be ground by the grinding means; and transporting means for transporting the glass plate to the bend-breaking supporting means and the grinding supporting means, wherein the grinding supporting means includes a grinding supporting table, a plurality of suction cups which are held on the grinding supporting table by being attached by suction to the grinding supporting table and suck and hold the glass plate by sucking the glass plate whose peripheral edge is to be ground, and arranging means for disposing the plurality of suction cups, respectively, at positions corresponding to a shape of the glass plate to be ground.

According to the glass-plate working apparatus in accordance with the first and second aspects of the invention, the grinding supporting means includes a grinding supporting table, a plurality of suction cups which are held on the grinding supporting table by being attached by suction to the grinding supporting table and suck and hold the glass plate by sucking the glass plate whose peripheral edge is to be ground, and arranging means for disposing the plurality of suction cups, respectively, at positions corresponding to a shape of the glass plate to be ground. Therefore, the suction cups are not restrained by the grinding supporting table and can be arranged at optimal positions for sucking and fixing the glass plate in correspondence with the different shape of the glass plate.

In the glass-plate working apparatus in accordance with a third aspect of the invention, in the glass-plate working apparatus according to the second aspect of the invention, the transporting means includes a first transporting device for transporting the glass plate to be bend-broken to the bend-breaking supporting means; and a second transporting means for transporting to the grinding supporting means the glass plate whose peripheral edge is to be ground and for carrying out the glass plate whose peripheral edge has been ground from the grinding supporting means, wherein while the glass plate is being bend-broken by the bend-breaking means, the second transporting device is adapted to carry out the glass plate whose peripheral edge has been ground from on the suction cups, and the arranging means is adapted to arrange the suction cups, respectively, at positions corresponding to the shape of the glass plate being bend-broken.

According to the glass-plate working apparatus in accordance with the third aspect of the invention, while the glass plate is being bend-broken by the bend-breaking means, the second transporting device is adapted to carry out the glass plate whose peripheral edge has been ground from on the suction cups, and the arranging means is adapted to arrange the suction cups, respectively, at positions corresponding to the shape of the glass plate being bend-broken. Therefore, the need to separately provide the time for arranging the suction cups can be made unnecessary, and it is hence possible to reduce the time required for working glass plates of various shapes.

In the glass-plate working apparatus in accordance with a fourth aspect of the invention, in the glass-plate working apparatus according to the second or third aspect of the invention, the bend-breaking means includes a bend-breaking head having a cutter wheel for forming the cut line by abutting against the glass plate and a push rod for push-breaking the glass plate by pressing, and bend-breaking-head moving means for moving the bend-breaking head relative to the glass plate.

In the glass-plate working apparatus in accordance with a fifth aspect of the invention, in the glass-plate working apparatus according to any one of the second to fourth aspects of the invention, the bend-breaking means includes cut-line forming means for forming the cut line on the glass plate and push-breaking means for push-breaking the glass plate with the cut line formed thereon by the cut-line forming means, wherein the cut-line forming means includes a cut-line forming head and cut-line-forming-head moving means for moving the cut-line forming head relative to the glass plate, and the push-breaking means includes a push-breaking head and push-breaking-head moving means for moving the push-breaking head relative to the glass plate.

In the glass-plate working apparatus in accordance with a sixth aspect of the invention, in the glass-plate working apparatus according to any one of the first to fifth aspects of the invention, the arranging means is adapted to be used in common for the suction cups.

According to the glass-plate working apparatus in accordance with the sixth aspect of the invention, since the arranging means is adapted to be used in common for the suction cups, in comparison with the case where the arranging means is provided for each suction cup, the interference in the operation of the arranging means does not occur, the construction becomes simple, and a reduction in cost can be attained.

In the glass-plate working apparatus in accordance with a seventh aspect of the invention, in the glass-plate working apparatus according to any one of the first to sixth aspects of the invention, the arranging means is adapted to arrange the suction cups at positions corresponding to the shape of the bend-broken glass plate.

In the glass-plate working apparatus in accordance with an eighth aspect of the invention, in the glass-plate working apparatus according to any one of the first to seventh aspects of the invention, the arranging means has suction-cup supporting body for supporting the suction cups separately from the grinding supporting table, and is adapted to move the suction cup from on the grinding supporting table onto the suction-cup supporting body or from on the suction-cup supporting body onto the grinding supporting table in correspondence with the shape of the glass plate.

According to the glass-plate working apparatus in accordance with the eighth aspect of the invention, the number of suction cups for sucking and holding the glass plate can be changed, as required. Hence, suction and holding can be effected by suction cups at positions suitable for sucking and holding the glass plates of various shapes.

In the glass-plate working apparatus in accordance with a ninth aspect of the invention, in the glass-plate working apparatus according to any one of the first to eighth aspects of the invention, the arranging means includes a suction-cup lifting device for raising the suction cup and a suction-cup moving device for moving the suction cup raised by the suction-cup lifting device.

In the glass-plate working apparatus in accordance with a 10th aspect of the invention, in the glass-plate working apparatus according to the ninth aspect of the invention, the suction cup includes a cylindrical body whose upper surface is covered with an elastic member for abutment against the glass plate; a disk body for abutment against the grinding supporting table; and a connecting shaft which connects the disk body and the cylindrical body, wherein the suction-cup lifting device has at least two grip arms which are moved close to or away from each other, and the grip arms respectively have recessed surfaces which are recessed with respect to the cylindrical body, the grip arms being adapted to grip the suction cup as the recessed surfaces are respectively abutted against peripheral edge portions of the cylindrical body while approaching each other.

According to the glass-plate working apparatus in accordance with the 10th aspect of the invention, at least two grip arms are adapted to grip the suction cup as the recessed surfaces are respectively abutted against peripheral edge portions of the cylindrical body. Hence, it is possible to reliably grip the suction cup, and therefore the suction cups can be reliably arranged at desired positions on the grinding supporting table.

In the glass-plate working apparatus in accordance with an 11th aspect of the invention, in the glass-plate working apparatus according to any one of the first to 10th aspects of the invention, the suction cup has an annular abutment surface for abutment against the grinding supporting table and a recessed surface which is recessed with respect to the grinding supporting table, and is adapted to be attached by suction to the grinding supporting table through an opening in the recessed surface.

In the glass-plate working apparatus in accordance with a 12th aspect of the invention, in the glass-plate working apparatus according to the 11th aspect of the invention, the suction cup includes the disk body having the annular abutment surface and the recessed surface; the cylindrical body whose upper surface is covered with the elastic member for abutment against a lower surface of the glass plate; and the connecting shaft which connects the disk body and the cylindrical body, the suction cup being adapted to suck the glass plate through an opening in an upper surface of the elastic member and to be attached by suction to the grinding supporting table through the opening in the recessed surface of the disk body.

It should be noted that, in the present invention, the glass-plate working apparatus including the grinding means and the grinding supporting means may be independently provided separately from the bend-breaking means and the bend-breaking supporting means.

According to the above-described invention, it is possible to provide a glass-plate working apparatus which makes it possible to arrange the suction cups at optimal positions for sucking and fixing the glass plate with respect to the respective shape of the glass plate.

Hereafter, a description will be given of the present invention and the mode for carrying out the invention on the basis of preferred examples illustrated in the drawings. It should be noted that the present invention is not limited to these embodiments.

EMBODIMENTS

Figure 1:
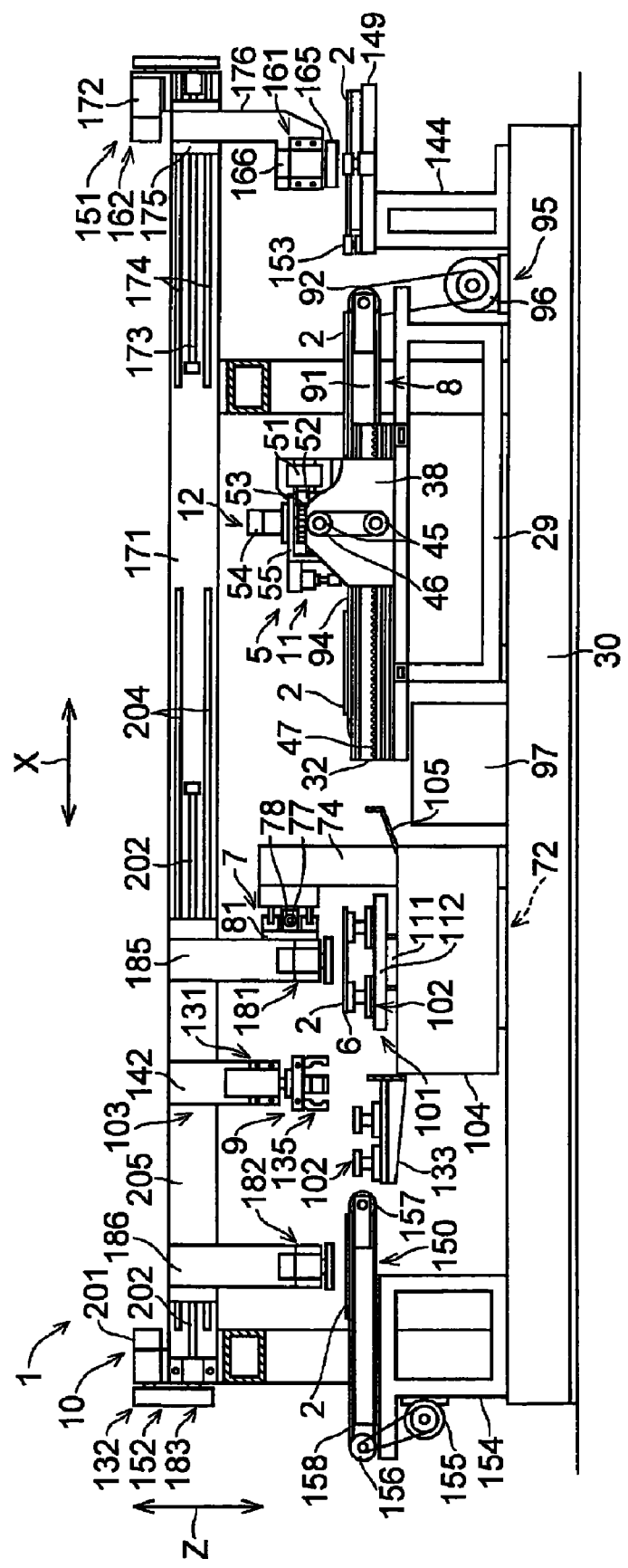
FIG. 1 is an explanatory front elevational view illustrating an embodiment of a glass-plate working apparatus in accordance with the invention.
Figure 2:
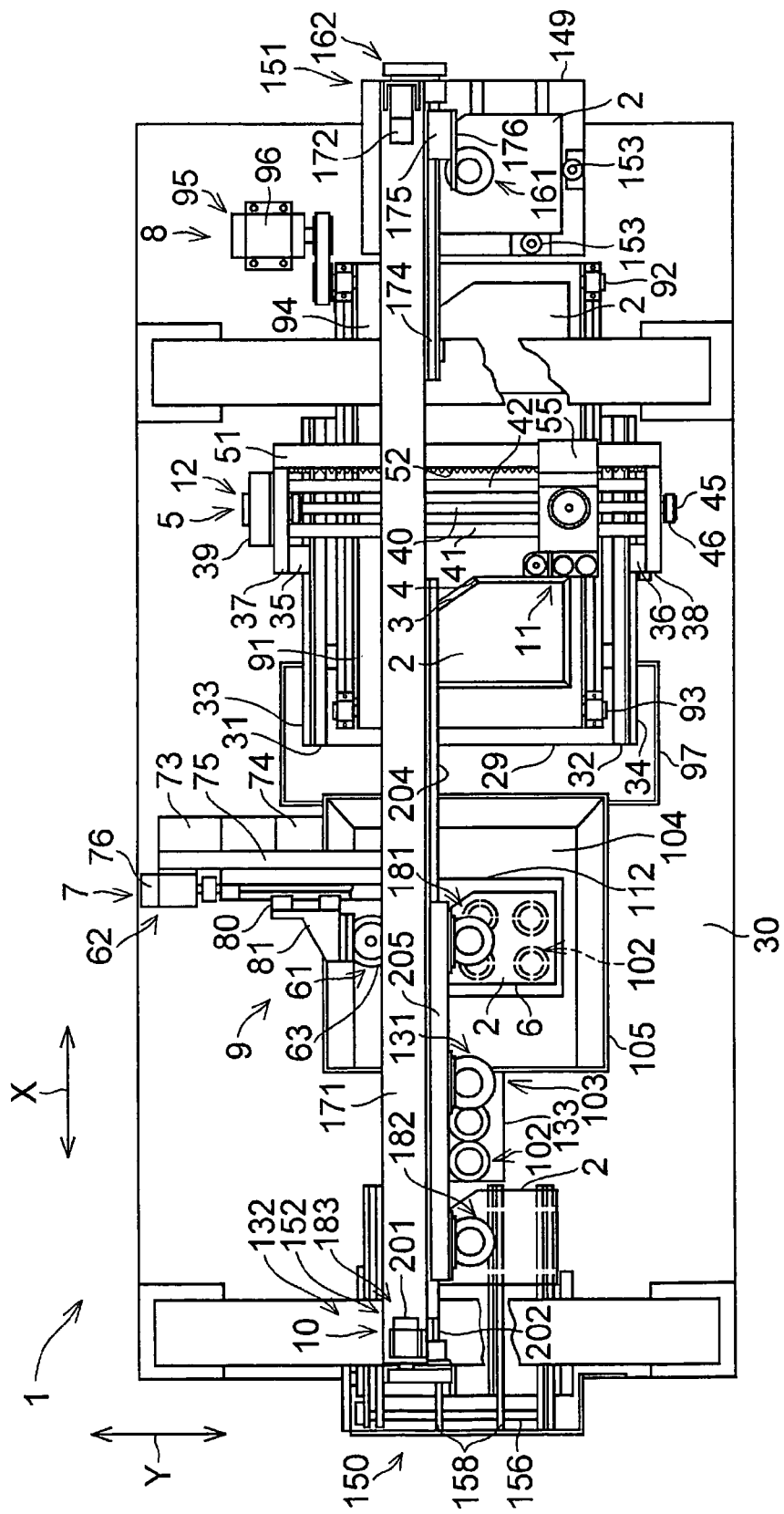
FIG. 2 is an explanatory plan view of the embodiment shown in FIG. 1.
Figure 3:
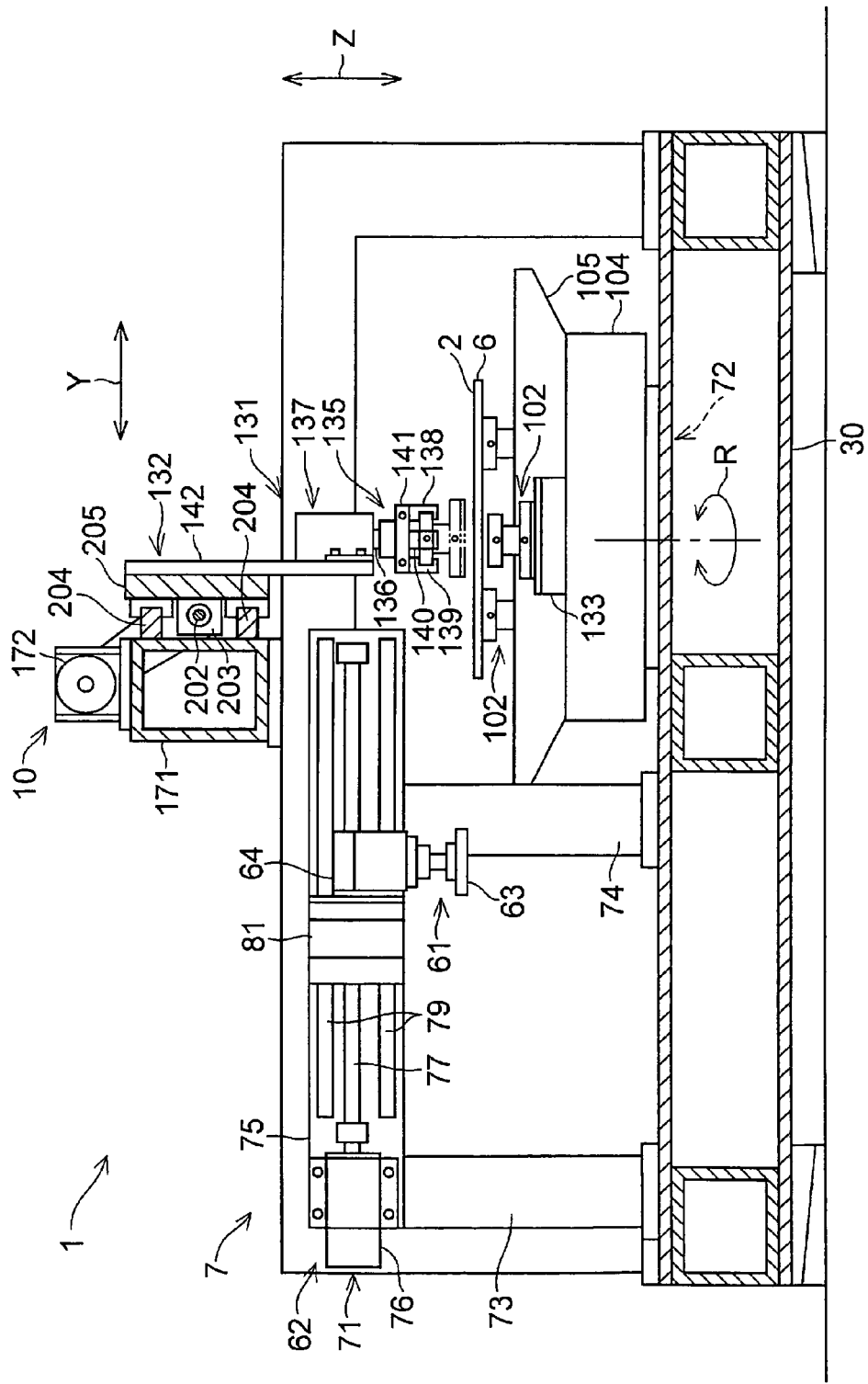
FIG. 3 is an explanatory side view of the embodiment shown in FIG. 1.

In FIGS. 1 to 9, a glass-plate working apparatus 1 in accordance with this embodiment is comprised of a bend-breaking means 5 for forming a main cut line 3 and an edge cut line 4 on a glass plate 2 and for bend-breaking the glass plate 2 by press-breaking along the main cut line 3 the glass plate 2 with the main cut line 3 and the edge cut line 4 formed thereon; a grinding means 7 for grinding a peripheral edge 6 of the glass plate 2 bend-broken by the bend-breaking means 5; a bend-breaking supporting means 8 for supporting the glass plate 2 to be bend-broken by the bend-breaking means 5; a grinding supporting means 9 for supporting the glass plate 2 whose peripheral edge 6 is to be ground by the grinding means 7; and a transporting means 10 for sequentially transporting the glass plate 2 to the bend-breaking supporting means 8 and the grinding supporting means 9.

The bend-breaking means 5 includes a bend-breaking head 11 and a bend-breaking-head moving means 12 for moving the bend-breaking head 11 in an X direction and a Y direction perpendicular to the X direction relative to the glass plate 2.

Figure 4:
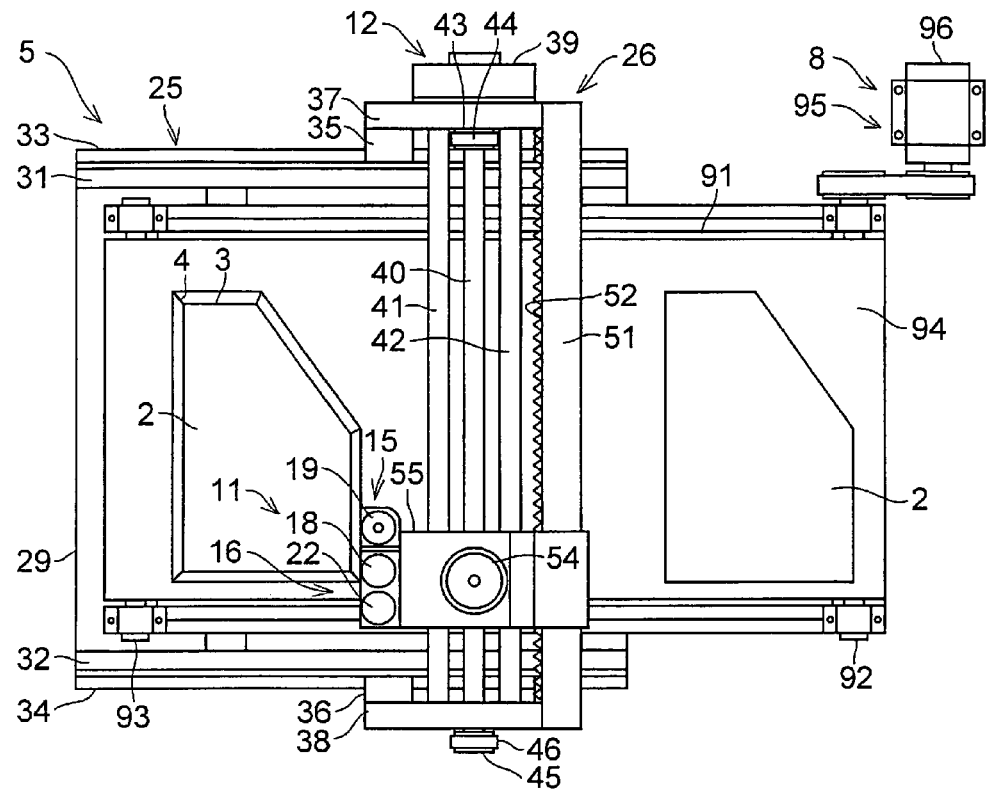
FIG. 4 is an explanatory enlarged plan view mainly illustrating a bend-breaking means and a bend-breaking supporting means of the embodiment shown in FIG. 1.
Figure 5:
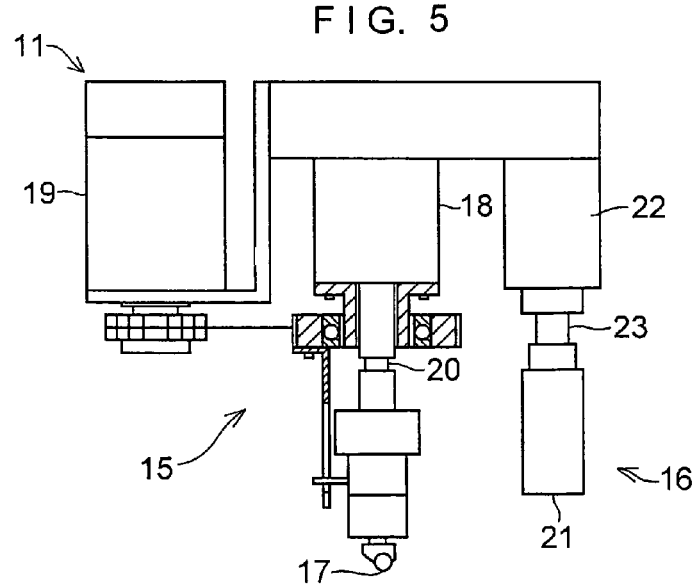
FIG. 5 is an explanatory enlarged view mainly illustrating a bend-breaking head of the embodiment shown in FIG. 1.

As particularly shown in FIGS. 4 and 5, the bend-breaking head 11 includes a cut-line forming means 15 for forming the main cut line 3 and the edge cut line 4 on the glass plate 2 as well as a push-breaking means 16 for push-breaking the glass plate 2 with the main cut line 3 and the edge cut line 4 formed thereon by the cut-line forming means 15.

The cut-line forming means 15 includes a cutter wheel 17, an air cylinder 18 for raising or lowering the cutter wheel 17, and an electric motor 19 for directing the blade of the cutter wheel 17 in the direction of forming a cut line. The cutter wheel 17 and an output rotating shaft of the electric motor 19 are connected by means of a pulley, a belt, and the like. The air cylinder 18 has a piston rod 20 which is reciprocatable in a Z direction, and the cutter wheel 17 is attached to the outer distal end of this piston rod 20. The air cylinder 18 and the electric motor 19 are mounted on a movable base 55.

The push-breaking means 16 includes a push rod 21 and an air cylinder 22 for raising or lowering the push rod 21. The air cylinder 22 has a piston rod 23 which is reciprocatable in the Z direction, and the push rod 21 is attached to an outer distal end of this piston rod 23. The air cylinder 22 is mounted on the movable base 55.

The bend-breaking-head moving means 12 has an X-direction moving device 25 for moving the bend-breaking head 11 in the X direction, as well as a Y-direction moving device 26 for moving the bend-breaking head 11 in the Y direction.

The X-direction moving device 25 includes frames 31 and 32 which are fixed to a base 30 by means of a supporting frame 29 in such a manner as to extend in the X direction, and are disposed in such a manner as to oppose each other in the Y direction with the bend-breaking supporting means 8 disposed therebetween; a pair of guide rails 33 and 34 which are respectively fixed to the frames 31 and 32 in such a manner as to extend in the X direction; sliders 35 and 36 which are respectively fitted to the guide rails 33 and 34 movably in the X direction; a movable base 37 secured to the slider 35; a movable base 38 secured to the slider 36; an electric motor 39 mounted on the movable base 37; a rotating shaft 40 having both end portions respectively supported rotatably by the movable bases 37 and 38, one end thereof being coupled to one end of the output rotating shaft of the electric motor 39; guide rails 41 and 42 which are disposed with the rotating shaft 40 positioned therebetween and bridge the movable bases 37 and 38; a pinion gear (not shown) connected to one end side of the rotating shaft 40 by means of a pulley 43, a timing belt 44, and the like and rotatably supported by the movable base 37; a rack gear (not shown) meshing with this pinion gear and secured to the frame 31 in such a manner as to extend in the X direction; a pinion gear (not shown) connected to the other end side of the rotating shaft 40 by means of a pulley 45, a timing belt 46, and the like and rotatably supported by the movable base 38; and a rack gear 47 meshing with this pinion gear and secured to the frame 32 in such a manner as to extend in the X direction. As the electric motor 39 is operated, the rotating shaft 40 is rotated, and the rotation of the rotating shaft 40 causes the respective pinion gears to rotate synchronously by means of the pulleys 43 and 45 and the timing belts 44 and 46 or the like. The movable bases 37 and 38 which rotatably support these pinion gears are thereby moved in the X direction along the guide rails 33 and 34. Thus, the bend-breaking head 11, which is mounted on the movable bases 37 and 38 by means of the Y-direction moving device 26, is adapted to be moved in the X direction.

The Y-direction moving device 26 includes a frame 51 bridging the movable bases 37 and 38 and extending in the Y direction; a rack gear 52 provided on a side surface of the frame 51 along that frame 51; a pinion gear 53 meshing with the rack gear; an electric motor 54 having an output rotating shaft secured to the pinion gear 53; and the movable base 55 on which the electric motor 54 is mounted and which is supported by the frame 51 movably in the Y direction, the movement thereof in the Y direction being guided by the guide rails 41 and 42. The bend-breaking head 11 is secured to the movable base 55.

The Y-direction moving device 26 is arranged such that as the electric motor 54 is operated, the movable base 55 is moved in the Y direction relative to the frame 51 by means of the pinion gear 53 and the rack gear 52, and as the movable base 55 is moved in the Y direction, the bend-breaking head 11 fixed to the movable base 55 is moved in the Y direction.

The grinding means 7 includes a grinding head 61 and a grinding-head moving means 62 for moving the grinding head 61 relative to the glass plate 2 to be ground.

The grinding head 61 has a grinding wheel 63 and an electric motor 64 for rotating the grinding wheel 63. The grinding wheel 63 is mounted on an output rotating shaft of the electric motor 64.

The grinding-head moving means 62 in this embodiment includes a Y-direction moving device 71 for moving the grinding head 61 in the Y direction relative to the glass plate 2, as well as a swiveling device 72 for swiveling the grinding head 61 in an R direction relative to the glass plate 2.

The Y-direction moving device 71 includes a frame 75 which is supported on the base 30 by means of supporting frames 73 and 74; an electric motor 76 fixed to the frame 75; a threaded shaft 77 coupled to one end of an output rotating shaft of the electric motor 76 and supported rotatably by the frame 75; a nut 78 threadedly engaged with the threaded shaft 77; a pair of guide rails 78 secured to the frame 75 and extending in the Y direction; a slider 80 fitted to the pair of guide rails 79, respectively; and a movable base 81 to which the slider 80 and the nut 78 are secured, the grinding head 61 being mounted on the movable base 81.

The Y-direction moving device 71 is arranged such that as the electric motor 76 is operated, the threaded shaft 77 is rotated, and the rotation of the threaded shaft 77 causes the movable base 81 to move in the Y direction by means of the nut 78, to thereby allow the grinding head 61 mounted on that movable base 81 to move in the Y direction.

The swiveling device 72 has an electric motor (not shown) whose output rotating shaft is coupled to a shaft 111. The swiveling device 72 is arranged such that as the shaft 111 is rotated by the rotation of the output rotating shaft of that electric motor, the glass plate 2 is rotated by means of a supporting plate 112 and suction cups 102, to thereby swivel the grinding head 61 in the R direction relatively with respect to the glass plate 2.

The bend-breaking supporting means 8 includes a supporting plate 91 installed on the base 30 by means of the supporting frame 29; a drum 92 mounted rotatably at one end, as viewed in the X direction, of the supporting plate 91; a drum 93 mounted rotatably at the other end, as viewed in the X direction, of the supporting plate 91; and a flexible endless belt 94 wound around and trained between the drums 92 and 93. The glass plate 2 is adapted to be placed on the endless belt 94 which is supported by the supporting plate 91 so as not to deflect.

It should be noted that the base 30 is provided with a traveling means 95 for causing the endless belt 94 to travel in the Y direction so as to discharge the cutlet of the glass plate 2 remaining on the endless belt 94. The traveling means 95 has an electric motor 96 mounted on the base 30, as well as a pulley, a belt, and the like for coupling an output rotating shaft of the electric motor 96 to the drum 92. In addition, a cullet accommodating section 97 for accommodating the cullet discharged from the endless belt 94 by the traveling means 95 is provided at a downstream end of the endless belt 94.

The grinding supporting means 9 includes a grinding supporting table 101 supported on the base 30; the plurality of independent suction cups 102 which are arranged at desired positions on the grinding supporting table 101 and are held on the grinding supporting table 101 by being attached thereto by suction, and which suck and hold the glass plate 2 by sucking the glass plate 2; an arranging means 103 for arranging the plurality of suction cups 102, respectively, at positions corresponding to the shape of the glass plate 2 to be ground; a frame 104 provided in such a manner as to surround the peripheries of the grinding supporting table 101; and a wall 105 secured to an upper end of the frame 104 to prevent the scattering of grinding dust caused by the grinding of the glass plate 2 by the grinding head 61.

The grinding supporting table 101 has the shaft 111 supported rotatably on the base 30 as well as the supporting plate 112 secured to the shaft 111, the suction cups 102 being adapted to be placed on the supporting plate 112.

Figure 6:
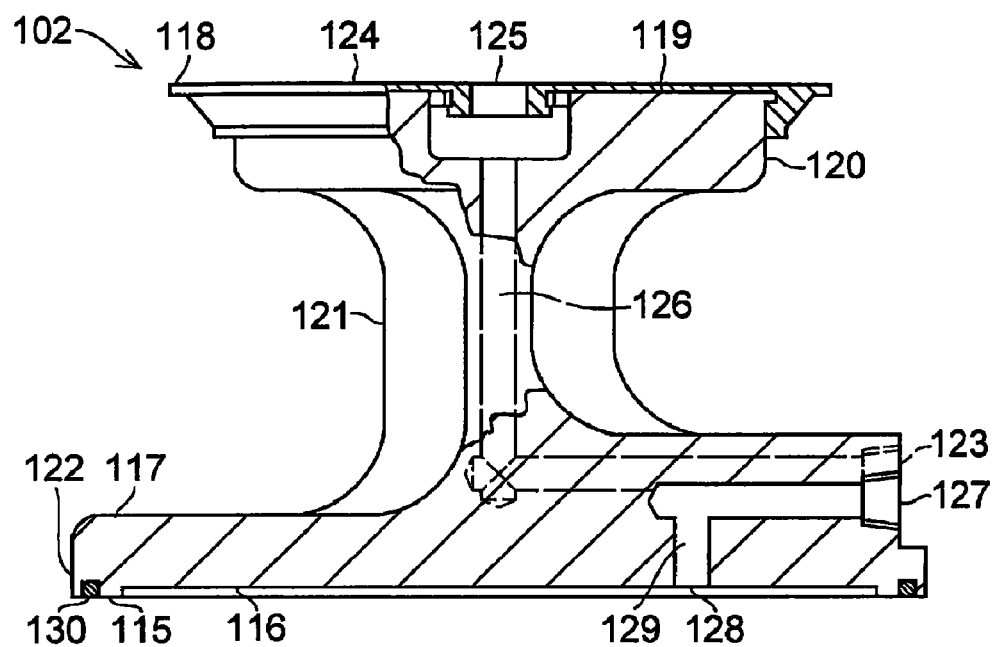
FIG. 6 is an explanatory enlarged side view mainly illustrating a suction cup of the embodiment shown in FIG. 1.
Figure 7:
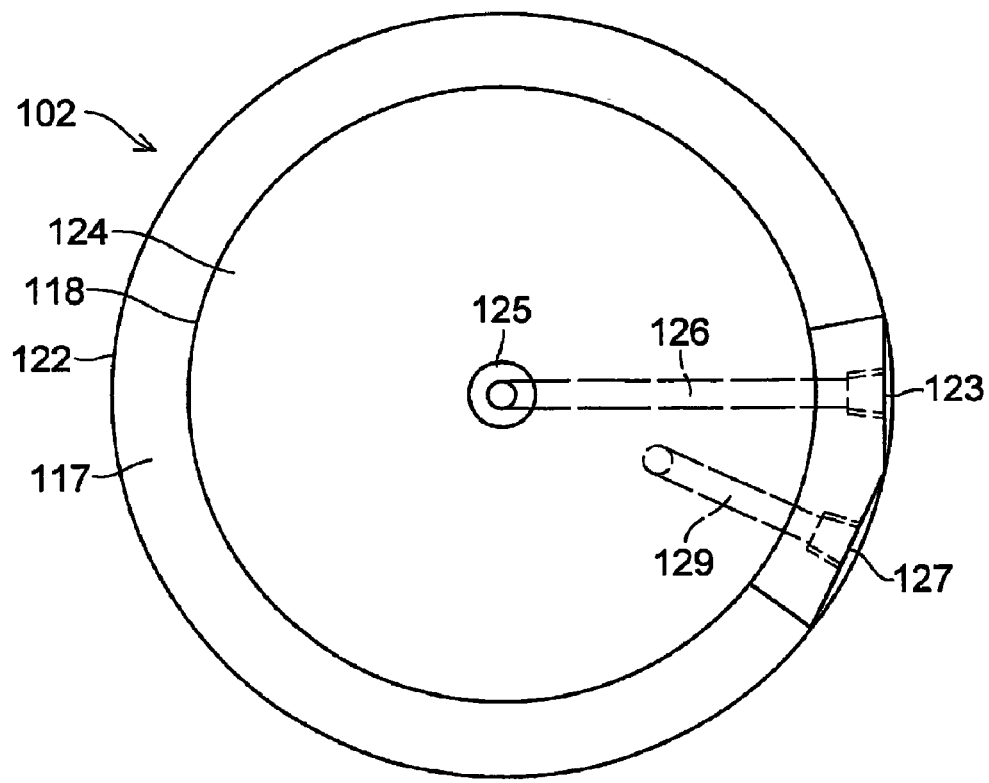
FIG. 7 is an explanatory enlarged plan view mainly illustrating the suction cup of the embodiment shown in FIG. 1.

As particularly shown in FIGS. 6 and 7, each of the suction cups 102 includes a disk body 117 having an annular abutment surface 115 for abutment against the supporting plate 112 and a recessed surface 116 which is recessed with respect to the supporting plate 112; a cylindrical body 120 whose upper surface 119 is covered with an elastic member 118 for abutment against a lower surface of the glass plate 2; a connecting shaft 121 which integrally connects the disk body 117 and the cylindrical body 120; a communicating hole 126 communicating with an opening 123 in a side peripheral surface 122 of the disk body 117 and an opening 125 in an upper surface 124 of the elastic member 118; and a communicating hole 129 communicating with an opening 127 in the side peripheral surface 122 and an opening 128 in the recessed surface 116. An annular elastic seal member 130 is provided in the abutment surface 115, and a vacuum suction unit (not shown) is connected to the openings 123 and 127 by means of flexible tubes or the like, respectively.

As the vacuum suction unit is actuated, the above-described plurality of suction cups 102 are adapted to suck and hold the glass plate 2 by sucking the lower surface of the glass plate 2 through the communicating holes 126 and by being attached by suction to the supporting plate 112 through the communicating holes 129.

The arranging means 103 includes a suction-cup lifting device 131 for raising the suction cup 102; a suction-cup moving device 132 for moving the suction cup 102 raised by the suction-cup lifting device 131; and a suction-cup supporting body 133 secured to the wall 105 to support the suction cups 102.

Figure 8:
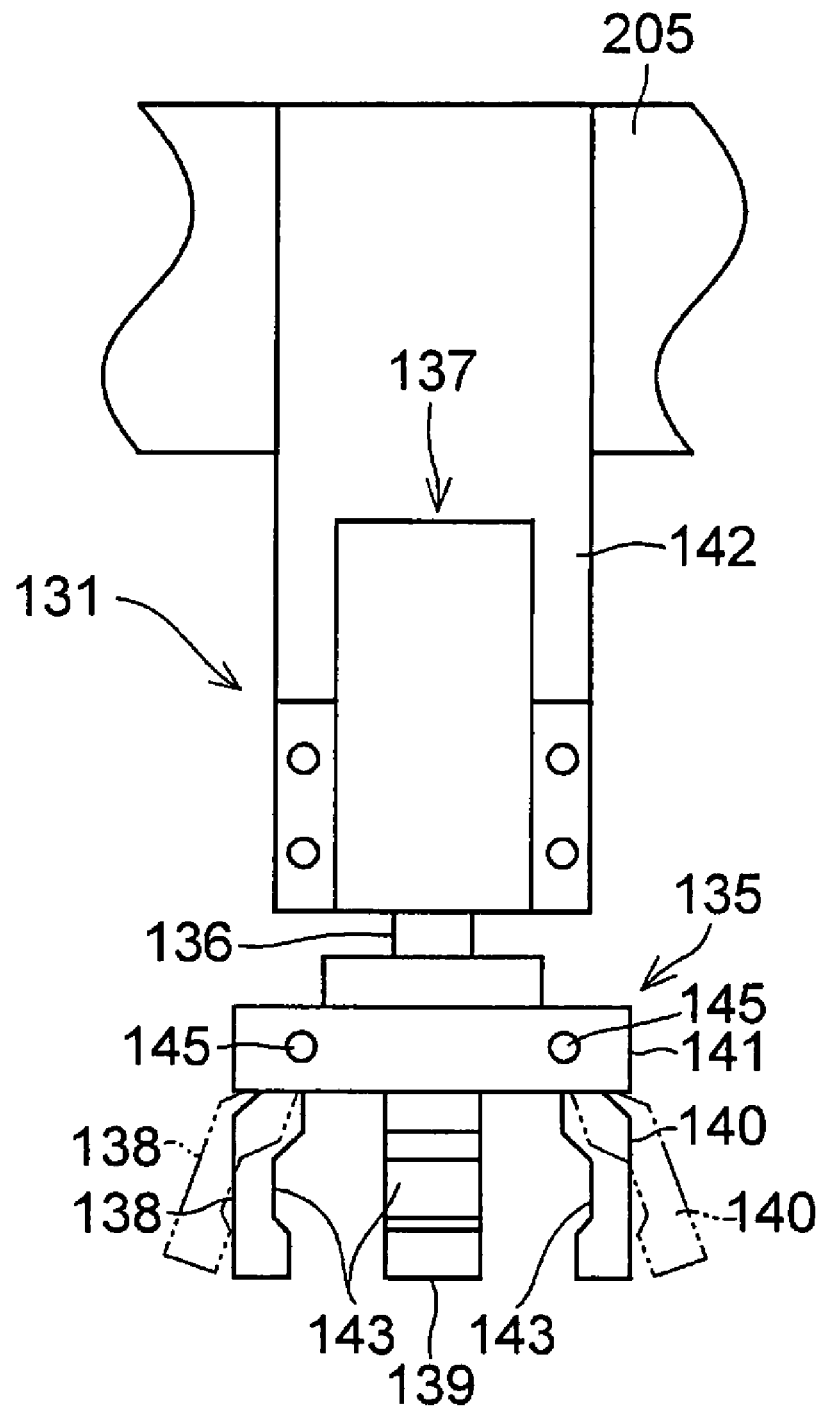
FIG. 8 is an explanatory enlarged front elevational view mainly illustrating a suction-cup lifting device of the embodiment shown in FIG. 1.
Figure 9:
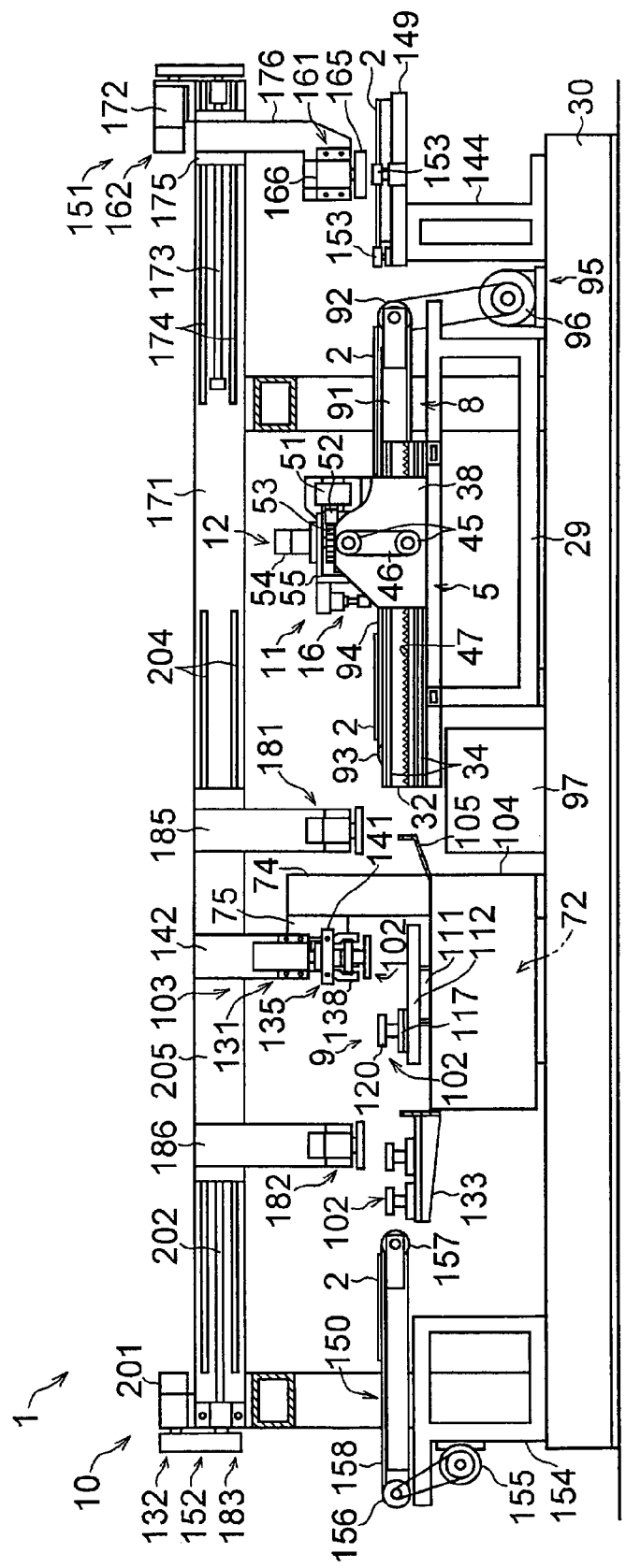
FIG. 9 is a diagram explaining the operation of the embodiment shown in FIG. 1.

As particularly shown in FIG. 8, the suction-cup lifting device 131 includes a gripper 135 for gripping the suction cup 102, as well as an air cylinder unit 137 having a piston rod 136 at one end of which the gripper 135 is fixed and which is movable in the Z direction perpendicular to the X direction and the Y direction. The gripper 135 includes grip arms 138, 139, and 140 which are moved close to or away from each other; an attachment body 141 to which the grip arms 138, 139, and 140 are attached; and a rotating mechanism for rotating synchronously with each other the grip arms 138, 139, and 140, respectively, about shafts 145 provided in the attachment body 141 as compressed air is supplied from a compressed air source. The air cylinder unit 137 is fixed to a slider 205 by means of a bracket 142, and the attachment body 141 is secured to the one end of the piston rod 136.

Each of the grip arms 138, 139, and 140 has a recessed surface 143 which is recessed with respect to the cylindrical body 120, and the recessed surfaces 143 are respectively adapted to abut against peripheral edge portions of the cylindrical body 120.

The suction-cup lifting device 131 is arranged such that the gripper 135 is lowered by the actuation of the air cylinder unit 137, and as compressed air is supplied to the rotating mechanism of the gripper 135, the grip arms 138, 139, and 140 are rotated and brought close to each other to thereby grip the cylindrical body 120 of the suction cup 102, the gripper 135 being then raised by the actuation of the air cylinder unit 137 to thereby raise the suction cup 102. In addition, the suction-cup lifting device 131 is arranged such that the gripper 135 is lowered by the actuation of the air cylinder unit 137, and as the supply of compressed air to the rotating mechanism 135 is stopped, the grip arms 138, 139, and 140 are rotated to move away from each other, thereby allowing the suction cup 102 to be placed on the grinding supporting table 101 or the suction-cup supporting body 133.

The suction-cup moving device 132 includes an electric motor 201 mounted on a glass-plate carrying-out side of an upper frame 171; a threaded shaft 202 which is rotatably supported at its both ends by the upper frame 171 by means of bearings and has one end coupled to an output rotating shaft of the electric motor 201 by means of a pulley, a belt, and the like in such a manner as to extend in the X direction; a nut 203 threadedly engaged with the threaded shaft 202; a pair of guide rails 204 installed on the upper frame 171 in such a manner as to extend in the X direction; and the slider 205 which is fitted to the pair of guide rails 204 slidably in the X direction and to which the nut 203 is secured. The air cylinder unit 137 is mounted on the slider 205 by means of the bracket 142.

The suction-cup moving device 132 is arranged such that the threaded shaft 202 is rotated by the operation of the electric motor 201, and the slider 205, to which the nut 203 threadedly engaged with the threaded shaft 202 is secured, is moved in the X direction by the rotation of the threaded shaft 202, thereby moving the suction-cup lifting device 131 installed on the slider 205.

The suction-cup supporting body 133 is disposed below the gripper 135, as viewed in the Z direction.

The arranging means 103 of this embodiment, which is used in common for the respective suction cups 102, raises the suction cup 102 on the suction-cup supporting body 133 by means of the suction-cup lifting device 131, and moves the raised suction cup 102 in the X direction by the suction-cup moving device 132 to position the suction cup 102 above the grinding supporting table 101. Further, the arranging means 103 lowers the suction cup 102 positioned above the grinding supporting table 101 by the suction-cup lifting device 131, and places the suction cup 102 at a desired position on the grinding supporting table 101, i.e., at a position corresponding to the shape of the glass plate 2 to be ground. In addition, in correspondence with the glass plate 2 having a different shape from that of the aforementioned glass plate 2, the arranging means 103 raises the suction cup 102 which became superfluous on the grinding supporting table 101 by the suction-cup lifting device 131, moves the raised suction cup 102 in the X direction by the suction-cup moving device 132 to position the suction cup 102 above the suction-cup supporting body 133, and lowers the suction cup 102 positioned above the suction-cup supporting body 133 by the suction-cup lifting device 131 to place the suction cup 102 on the suction-cup supporting body 133. Furthermore, in correspondence with the glass plate 2 having a different shape from that of the aforementioned glass plate 2, the arranging means 103 raises the suction cup 102 on the grinding supporting table 101 by the suction-cup lifting device 131, moves the raised suction cup 102 in the X direction by the suction-cup moving device 132, concurrently rotates the grinding supporting table 101 by the swiveling device 72 to position the suction cup 102 above a desired position on the grinding supporting table 101, and lowers the suction cup 102 positioned above the desired position by the suction-cup lifting device 131 to place the suction cup 102 at the desired position on the grinding supporting table 101. When the suction cup 102 held by suction on the grinding supporting table 101 is raised, the suction of the grinding supporting table 101 by the suction cup 102 is adapted to be released.

The above-described arranging means 103 is adapted to arrange the suction cups 102 at positions corresponding to the shape which is defined by the peripheral edges 6 of the glass plate 2 to be ground on the grinding supporting table 101.

The transporting means 10 includes a placing table 149 disposed on the glass-plate carrying-in end side of the glass-plate working apparatus 1; a placing table 150 disposed on the glass-plate carrying-out end side of the glass-plate working apparatus 1; a transporting device 151 for transporting the glass plate 2 to be bend-broken on the placing table 149 to the bend-breaking supporting means 8; and a transporting device 152 for transporting the glass plate 2 bend-broken by the bend-breaking means 5 from the bend-breaking supporting means 8 to the grinding supporting means 9, and for transporting the glass plate 2 whose peripheral edge 6 has been ground by the grinding means 7 from the grinding supporting means 9 to the placing table 150.

The placing table 149 is supported on the base 30 by means of a frame 144, and has rollers 153 for positioning the glass plate 2.

The placing table 150 has an electric motor 155 supported by a frame 154; a drive-side drum 156 and a driven-side drum 157 which are rotatably supported on the frame 154; and a plurality of endless belts 158 trained between the drums 156 and 157. An output rotating shaft (not shown) of the electric motor 155 is coupled to the drum 156 by means of a pulley, a belt, and the like.

The placing table 150 is arranged such that as the electric motor 155 is operated, the drum 156 is rotated to cause the endless belts 158 trained between the drums 156 and 157 to travel, to thereby carry out the worked glass plate 2 on the placing table 150 from the glass-plate working apparatus 1.

The transporting device 151 includes a lifting device 161 for raising the glass plate 2 on the placing table 149, as well as a moving device 162 for moving in the X direction the glass plate 2 raised by the lifting device 161.

The lifting device 161 includes a suction cup unit 165 for sucking and holding the upper surface of the glass plate 2, as well as an air cylinder unit 166 having a piston rod at one end of which the suction cup unit 165 is secured. The suction cup unit 165 is connected to a vacuum suction unit (not shown) through the piping and a valve.

The moving device 162 includes an electric motor 172 mounted on the glass-plate carrying-in side of the upper frame 171; a threaded shaft 173 which is rotatably supported at its both ends by the upper frame 171 by means of bearings and has one end coupled to an output rotating shaft of the electric motor 172 by means of a pulley, a belt, and the like in such a manner as to extend in the X direction; a nut (not shown) threadedly engaged with the threaded shaft 173; a pair of guide rails 174 installed on the upper frame 171 in such a manner as to extend in the X direction; and a slider 175 which is fitted to the pair of guide rails 174 slidably in the X direction and to which the nut is secured. The air cylinder unit 166 is mounted on the slider 175 by means of a bracket 176. The moving device 162 is arranged such that the threaded shaft 173 is rotated by the operation of the electric motor 172, and the slider 175, to which the nut threadedly engaged with the threaded shaft 173 is secured, is moved in the X direction by the rotation of the threaded shaft 173, thereby moving the lifting device 161 installed on the slider 175 by means of the bracket 176.

The transporting device 152 includes a lifting device 181 for raising the glass plate 2 on the endless belt 94; a lifting device 182 for raising the glass plate 2 on the suction cups 102; and a moving device 183 for moving in the X direction the glass plate 2 raised by the lifting devices 181 and 182. The lifting devices 181 and 182 are installed on the slider 205 by means of brackets 185 and 186, respectively.

Since the lifting devices 181 and 182 are respectively formed in the same way as the lifting device 161, a detailed description thereof will be omitted.

The moving device 183 uses the electric motor 201, the threaded shaft 202, the nut 203, the guide rails 204, and the slider 205 jointly with the suction-cup moving device 132, so that a detailed description thereof will be omitted.

The above-described transporting means 10 is arranged such that the glass plate 2 to be bend-broken on the placing table 149 is raised and moved in the X direction by the transporting device 151 and is placed on the endless belt 94. Concurrently, by means of the transporting device 152, the glass plate 2 which is placed on the endless belt 94 and whose peripheral edge 6 is to be ground is raised and moved in the X direction and is placed on the suction cups 102, and the glass plate 2 which is placed on the suction cups 102 and is to be carried out is raised and moved in the X direction and is placed on the placing table 150.

The glass-plate working apparatus 1 of this embodiment further includes a numerical controller (not shown). This numeral controller is connected to the electric motors 19, 39, 54, 64, 76, 96, 155, 172, and 201 and the electric motor of the swiveling device 72, and is adapted to control the above- and below-described operation by controlling the rotation of their output rotating shafts.

In addition, although the rotation control of the output rotating shaft of the electric motor 64 may be effected by the numerical controller, the present invention is not limited to the same, and the output rotating shaft of the electric motor 64 may constantly be rotated at a fixed rotational speed.

In a case where the glass plate 2 is worked by the above-described glass-plate working apparatus 1, the glass plate 2 which is placed on the placing table 149 and is to be bend-broken is first raised, is moved in the X direction, and is placed on the upstream end side of the endless belt 94 by the transporting device 151. The placed glass plate 2 is then moved from the upstream end side to the downstream end side by causing the endless belt 94 to travel by the traveling means 95. Next, the bend-breaking head 11 is moved in the X direction and the Y direction by the bend-breaking-head moving means 12 to dispose the cutter wheel 17 above the position where the main cut line 3 and the edge cut line 4 are to be formed on the glass plate 2. The cutter wheel 17 is then lowered by the actuation of the air cylinder 18 and is abutted against the glass plate 2. The abutted cutter wheel 17 is moved in the X direction and the Y direction by the bend-breaking-head moving means 12 to form the main cut line 3 and the edge cut line 4 on the glass plate 2. During the formation of the main cut line 3 and the edge cut line 4, the cutter wheel 17 is rotated by the operation of the electric motor 19 such that its blade is oriented in the cut-line forming direction. Next, the bend-breaking head 11 is moved in the X direction and the Y direction by the bend-breaking-head moving means 12 to dispose the push rod 21 above the position where the glass plate 2 with the main cut line 3 and the edge cut line 4 formed thereon is to be pressed. The push rod 21 is then lowered by the actuation of the air cylinder 22, and the glass plate 2 is push-broken by pressing. Next, the bend-broken glass plate 2 on the endless belt 94 is raised, is moved in the X direction, and is placed on the suction cups 102 by the transporting device 152. The lower surface of the glass plate 2 placed on the suction cups 102 is sucked through the openings 125 in the suction cups 102 by the actuation of the vacuum suction units. At the same time, the suction cups 102 are attached by suction to the supporting plate 112 with the suction cups 102 placed thereon through the openings in the suction cups 102 by the actuation of the vacuum suction units, to thereby fix the suction cups 102 to the supporting plate 112 and suck and hold the glass plate 2. The grinding head 61 is moved in the Y direction relative to the sucked and held glass plate 2 and is relatively swiveled in the R direction by the grinding-head moving means 62, to thereby allow the grinding wheel 63 being rotated by the electric motor 64 to abut against the peripheral edge 6 of the glass plate 2. The grinding wheel 63 is moved in the Y direction and is relatively swiveled in the R direction to thereby grind the peripheral edge 6 of the glass plate 2. Next, the glass plate 2 whose peripheral edge 6 has been ground on the suction cups 102 is raised, is moved in the X direction, and is placed on the placing table 150 by the transporting device 152. As for the placed glass plate 2, the drum 156 is rotated by the operation of the electric motor 155 to cause the endless belts 158 trained between the drums 156 and 157 to travel, to thereby carry out the worked glass plate 2 on the placing table 150 from the glass-plate working apparatus 1. After the ground glass plate 2 is transported from on the suction cups 102 onto the placing table 150 by the transporting device 152, the suction cup 102 on the grinding supporting table 101 or the suction-cup supporting body 133 is raised and is moved in the X direction by the arranging means 103, and is thereby placed at a position on the grinding supporting table 101 corresponding to the shape of the glass plate 2 of a different shape to be ground next or on the suction-cup supporting body 122.

With the above-described glass-plate working apparatus 1, since the suction cups 102 are adapted to be releasably held on the grinding supporting table 101, the suction cups 102 are not restrained by the grinding supporting table 101 and can be arranged on and fixed to the grinding supporting table 101 at optimal positions for sucking and fixing the glass plate 2 in correspondence with the different shape of the glass plate 2.

In FIGS. 10 to 14, a glass-plate working apparatus 191 in accordance with another embodiment is comprised of a bend-breaking means 195 for forming the main cut line 3 and the edge cut line 4 on the glass plate 2 and for bend-breaking the glass plate 2 by press-breaking along the main cut line 3 the glass plate 2 with the main cut line 3 and the edge cut line 4 formed thereon; a grinding means 197 for grinding the peripheral edge 6 of the glass plate 2 bend-broken by the bend-breaking means 195; a bend-breaking supporting means 198 for supporting the glass plate 2 to be bend-broken by the bend-breaking means 195; a grinding supporting means 199 for supporting the glass plate 2 whose peripheral edge 6 is to be ground by the grinding means 197; and a transporting means 200 for transporting the glass plate 2 to the bend-breaking supporting means 198 and the grinding supporting means 199.

The bend-breaking means 195 includes a cut-line forming means 211 for forming the main cut line 3 on the glass plate 2 as well as a push-breaking means 212 for push-breaking the glass plate 2 with the main cut line 3 formed thereon by the cut-line forming means 211, by forming the edge cut line 4 on that glass plate 2.

The cut-line forming means 211 includes a cut-line forming head 221 as well as a cut-line-forming-head moving means 222 for moving the cut-line forming head 221 in the X direction and the Y direction relative to the glass plate 2.

Figure 10:
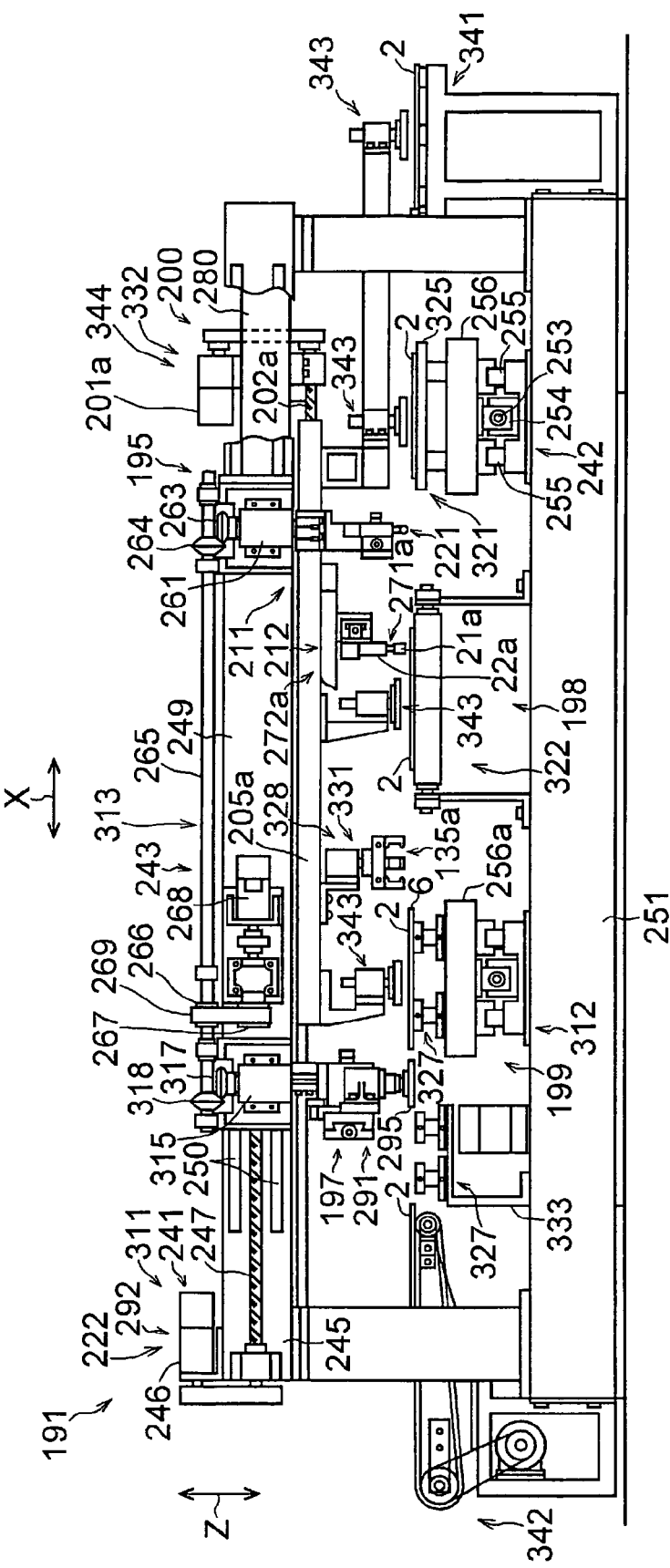
FIG. 10 is an explanatory front elevational view illustrating another embodiment of the invention.
Figure 11:
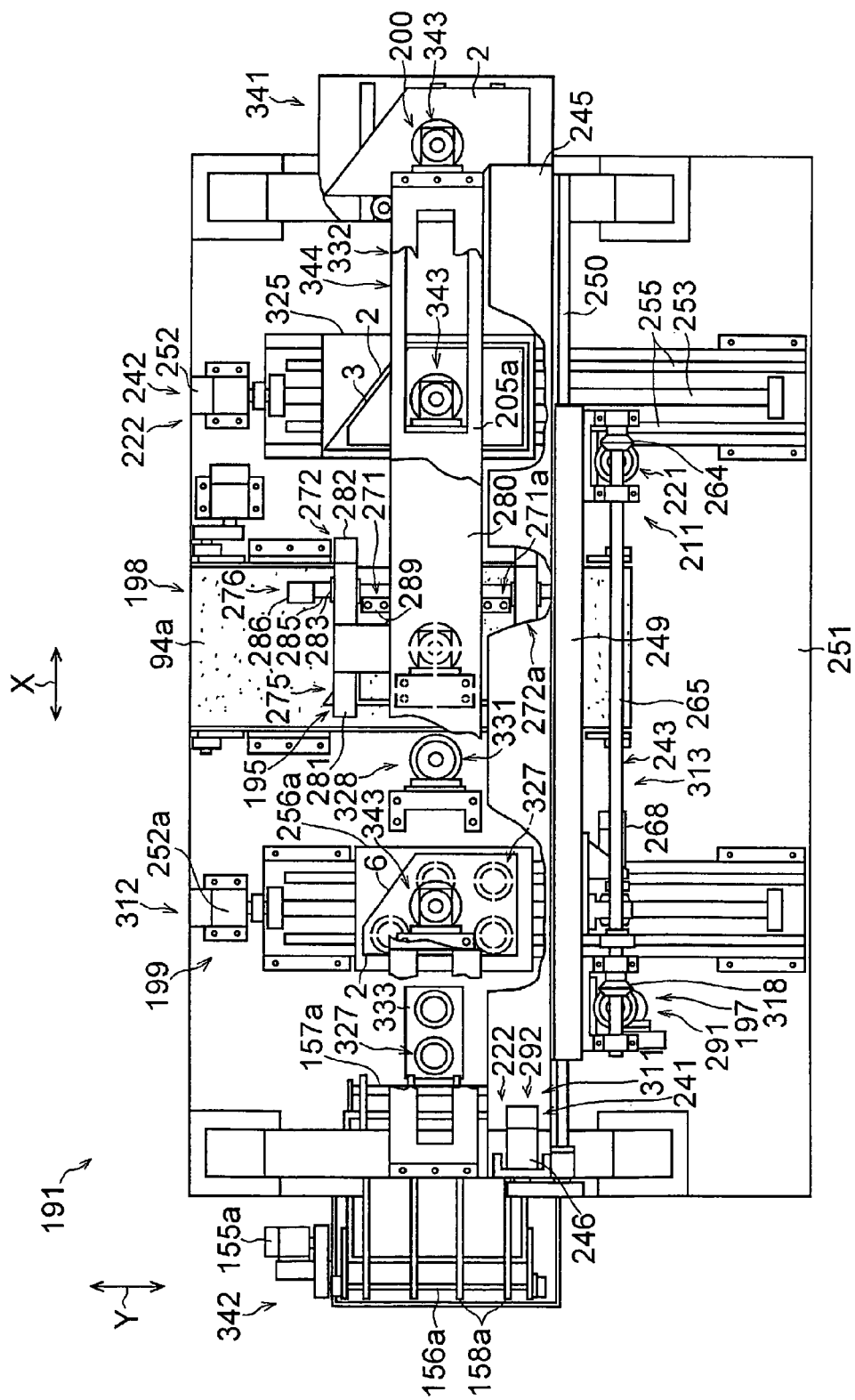
FIG. 11 is an explanatory plan view of the embodiment shown in FIG. 10.
Figure 12:
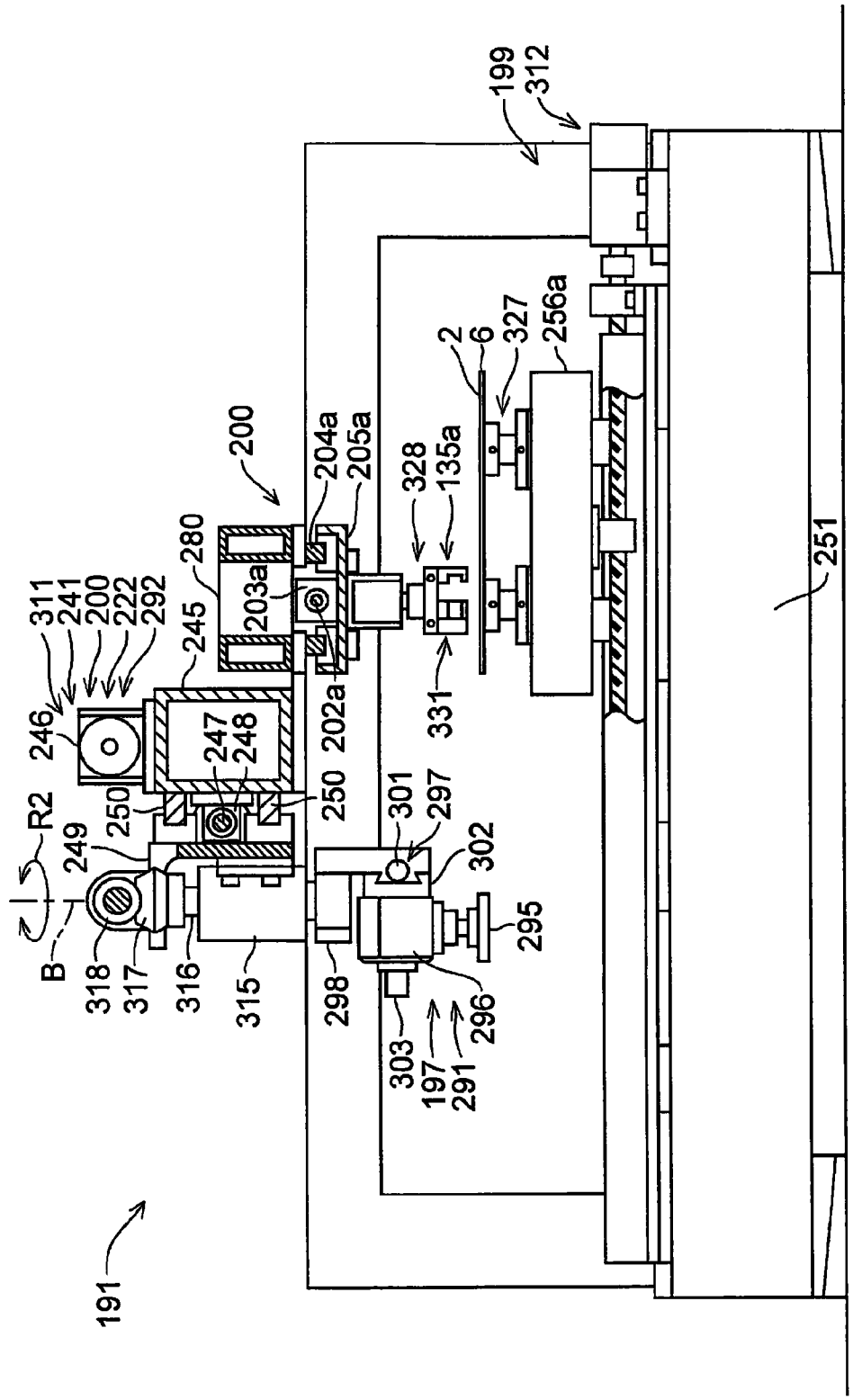
FIG. 12 is an explanatory side view of the embodiment shown in FIG. 10.
Figure 13:
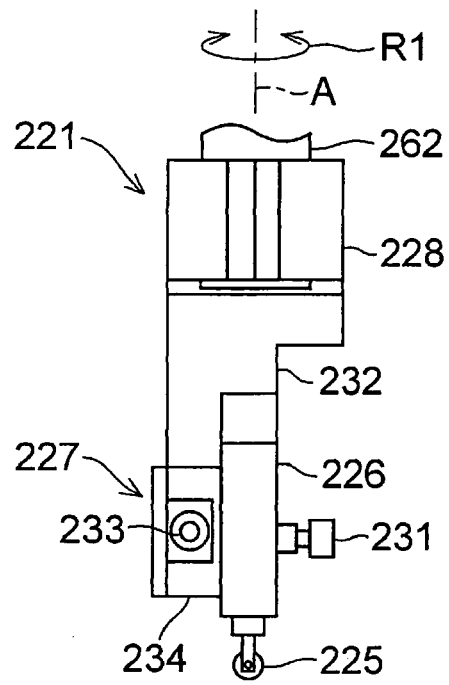
FIG. 13 is an explanatory enlarged front elevational view mainly illustrating a cut-line forming head of the embodiment shown in FIG. 10.

As particularly explained in detail in FIG. 10, the cut-line forming head 221 includes a cut-line forming cutter wheel 225; an air cylinder 226 for raising or lowering the cutter wheel 225; a fine adjustment mechanism 227 for finely adjusting the position of the cutter wheel 225; and a gripper 228 attached to a lower end of a shaft 262. The air cylinder 226 has a piston rod which is movable in the Z direction, and the cutter wheel 225 is rotatably mounted at a distal end of the piston rod.

The fine adjustment mechanism 227 includes a threaded shaft 231 attached rotatably to the gripper 228 in such a manner as to extend in the X direction; an X-direction slide 232 to which a nut threadedly engaged with the threaded shaft 231 is secured and which is fitted to the gripper 228 so as to be movable in the X direction; a threaded shaft 233 attached rotatably to the X-direction slide 232 in such a manner as to extend in the Y direction; and a Y-direction slide 234 to which a nut threadedly engaged with the threaded shaft 233 is secured and which is fitted to the X-direction slide 232 so as to be movable in the Y direction. The air cylinder 226 is fixed to the Y-direction slide 234.

The fine adjustment mechanism 227 is adapted to adjust the movement of the X-direction slide 232 in the X direction relative to the gripper 228 by rotating the threaded shaft 231 by means of a knob, and adjust the movement of the Y-direction slide 234 in the Y direction relative to the X-direction slide 232 by rotating the threaded shaft 233 by means of a knob, so as to finely adjust the position of the cutter wheel 225 in the X and Y directions by means of the air cylinder 226. It should be noted that the fine adjustment mechanism 227 finely adjusts the position of the cutter wheel 225 such that a cut-line forming point where the cutter wheel 225 comes into contact with the glass plate 2 to form the cut line 3 on the glass plate 2 is located on an axis A of the cut-line forming head 221.

The cut-line-forming-head moving means 222 includes an X-direction moving device 241 for moving the cut-line forming head 221 in the X direction relative to the glass plate 2; a Y-direction moving device 242 for moving the cut-line forming head 221 in the Y direction relative to the glass plate 2; and a swiveling means 243 for swiveling the cut-line forming head 221 in an R1 direction relative to the glass plate 2.

The X-direction moving device 241 includes an electric motor 246 mounted on an upper frame 245; a threaded shaft 247 coupled to an output rotating shaft of the electric motor 246 by means of a pulley, a belt, and the like and mounted rotatably on the upper frame 245 in such a manner as to extend in the X direction; a nut 248 threadedly engaged with the threaded shaft 247; a movable base 249 to which this nut 248 is secured; and a pair of guide rails 250 fitted to the movable base 249 and fixed to the upper frame 245 in such a manner as to extend in the X direction. The guide rails 250 are adapted to guide the movable base 249 in the X direction. The cut-line forming head 221 is mounted on the movable base 249 by means of a bearing 261 and the shaft 262.

The X-direction moving device 241 is arranged such that as the electric motor 246 is operated, the threaded shaft 247 is rotated, which rotation moves in the X direction the movable base 249 to which the nut 248 threadedly engaged with the threaded shaft 247 is secured, to thereby allow the cut-line forming head 221 mounted on the movable base 249 to move in the X direction.

The Y-direction moving device 242 includes an electric motor 252 fixed to a base 251; a threaded shaft 253 coupled to an output rotating shaft of the electric motor 252 and supported rotatably on the base 251 by means of a bearing in such a manner as to extend in the Y direction; a nut 254 threadedly engaged with the threaded shaft 253; a pair of guide rails 255 secured to the base 251 and extending in the Y direction; and a supporting plate 256 to which the nut 254 is secured and which is fitted to the guide rails 255 movably in the Y direction. A suction table 325 is installed on the supporting plate 256.

The Y-direction moving device 242 is arranged such that as the electric motor 252 is operated, the threaded shaft 253 is rotated, which rotation causes supporting plate 256, to which the nut 254 threadedly engaged with the threaded shaft 253 is secured, to move in the Y direction, to thereby allow the cut-line forming head 221 to move in the Y direction relative to the glass plate 2 attached by suction to the suction table 325.

The swiveling means 243 includes the bearing 261 installed on the movable base 249; the shaft 262 held rotatably by the bearing 261 and extending in the Z direction; a bevel gear 263 installed at an upper end of the shaft 262; a bevel gear 264 threadedly engaged with the bevel gear 263; a line shaft 265 to which the bevel gear 264 is secured and which is supported rotatably on the movable base 249 in such a manner as to extend in the X direction; a pulley 266 secured to the line shaft 265; a pulley 267, a timing belt 269 being wound around and trained between the same and the pulley 266; and an electric motor 268 mounted on the movable base 249 and having an output rotating shaft to which the pulley 267 is fixed. The gripper 228 is attached to a lower end of the shaft 262.

The swiveling means 243 is arranged such that as the electric motor 268 is operated, the line shaft 265 is rotated by means of the pulley 266, the timing belt 269, and the pulley 267, which rotation rotates the shaft 262 by means of the bevel gears 263 and 264. Thus, the swiveling means 243 causes the cut-line forming head 221 attached suspendedly to the lower end of the shaft 262 to swivel in the R1 direction.

The push-breaking means 212 includes push-breaking heads 271 and 271a, as well as push-breaking-head moving devices 272 and 272a for respectively moving the push-breaking heads 271 and 271a in the X direction and the Y direction relative to the glass plate 2.

The push-breaking heads 271 and 271a are respectively formed similarly, and the push-breaking head 271 effects the bend-breaking of the glass plate 2 in its half area, while the push-breaking head 271a effects the bend-breaking of the glass plate 2 in its remaining half area. Accordingly, a detailed description will be given hereafter of the push-breaking head 271, and with respect to the push-breaking head 271a a reference character 'a' will be added in the drawings, as required, and a detailed description thereof will be omitted.

The push-breaking head 271 includes an edge-cut-line forming means for forming the edge cut line 4 on the glass plate 2 with the main cut line 3 formed thereon, as well as a push-breaking means for push-breaking along the main cut line 3 the glass plate 2 with the edge cut line 4 formed thereon by the edge-cut-line forming means. Since the edge-cut-line forming means and the push-breaking means are respectively formed in the same way as the above-described cut-line forming means 15 and the push-breaking means 16, a detailed description thereof will be omitted.

The push-breaking-head moving devices 272 and 272a are respectively formed similarly. The push-breaking-head moving device 272 moves the push-breaking head 271 relative to the glass plate 2 in its half area, while the push-breaking-head moving device 272a moves the push-breaking head 271a relative to the glass plate 2 in its remaining half area. Accordingly, a detailed description will be given hereafter of the push-breaking-head moving device 272, and with respect to the push-breaking-head moving device 272a a reference character 'a' will be added in the drawings, as required, and a detailed description thereof will be omitted.

The push-breaking-head moving device 272 has an X-direction moving device 275 for moving the push-breaking head 271 in the X direction, as well as a Y-direction moving device 276 for moving the push-breaking head 271 in the Y direction.

The X-direction moving device 275 includes a frame 281 extending in the X direction and fixed to an upper frame 280 extending in the X direction and juxtaposed to the upper frame 245; an electric motor 282 mounted to one end of the frame 281; a threaded shaft (not shown) supported rotatably by the frame 281 and having one end connected to an output rotating shaft of the electric motor 282 in such a manner as to extend in the X direction; a slider 283 to which a nut threadedly engaged with the threaded shaft is secured; and a pair of guide rails (not shown) fitted to the slider 283 and attached to the frame 281 in such a manner as to extend in the X direction, so as to be able to guide the slider 283 in the X direction. The slider 283 is mounted on a frame 285. It should be noted that a frame 281*a* is fixed to the upper frame 245.

The X-direction moving device 275 is adapted to move the push-breaking head 271 in the X direction by means of the frame 285 and the like as the operation of the electric motor 282 rotates the threaded shaft connected to the output rotating shaft of the electric motor 282, and this rotation causes the slider 283, to which the nut threadedly engaged with the threaded shaft is secured, to move in the X direction.

The Y-direction moving device 276 includes the frame 285 attached to the slider 283 in such a manner as to extend in the Y direction; an electric motor 286 mounted to one end of the frame 285; a threaded shaft supported rotatably by the frame 285 and having one end connected to an output rotating shaft of the electric motor 286 in such a manner as to extend in the Y direction; a movable base to which a nut threadedly engaged with this threaded shaft is secured; and a pair of guide rails fitted to this movable base and attached to the frame 285 in such a manner as to extend in the Y direction. The push-breaking head 271 is mounted on the movable base by means of a bracket 289. The Y-direction moving device 276 is adapted to move the push-breaking head 271 mounted on the movable base in the Y direction as the operation of the electric motor 286 rotates the threaded shaft connected to the output rotating shaft of the electric motor 286, and this rotation causes the movable base, to which the nut threadedly engaged with the threaded shaft is secured, to move in the Y direction.

The grinding means 197 includes a grinding head 291 and a grinding-head moving means 292 for moving the grinding head 291 relative to the glass plate 2.

Figure 14:
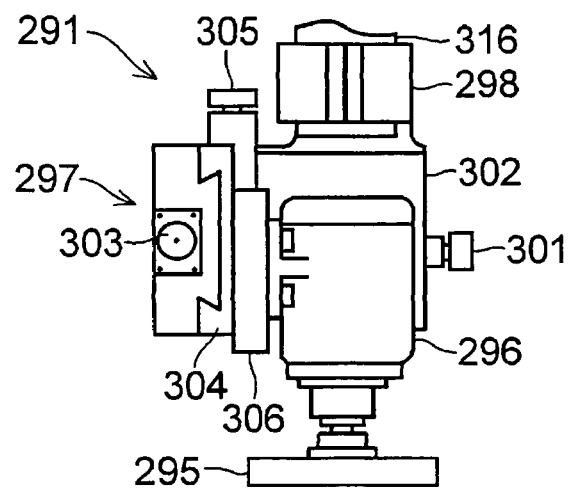
FIG. 14 is an explanatory enlarged front elevational view mainly illustrating a grinding head of the embodiment shown in FIG. 10.

As particularly shown in FIG. 14, the grinding head 291 includes a grinding wheel 295; an electric motor 296 for rotating the grinding wheel 295; a fine adjustment mechanism 297 for finely adjusting the position of the grinding wheel 295; and a gripper 298 attached to a lower end of a shaft 316. The grinding wheel 295 is attached to an output rotating shaft of the electric motor 296.

The fine adjustment mechanism 297 includes a threaded shaft 301 attached rotatably to the gripper 298 in such a manner as to extend in the X direction; an X-direction slide 302 to which a nut threadedly engaged with the threaded shaft 301 is secured and which is fitted to the gripper 298 so as to be movable in the X direction; a threaded shaft 303 attached rotatably to the X-direction slide 302 in such a manner as to extend in the Y direction; a Y-direction slide 304 to which a nut threadedly engaged with the threaded shaft 233 is secured and which is fitted to the X-direction slide 302 so as to be movable in the Y direction; a threaded shaft 305 attached rotatably to the Y-direction slide 304 in such a manner as to extend in the Z direction; and a Z-direction slide 306 to which a nut threadedly engaged with the threaded shaft 305 is secured and which is fitted to the Y-direction slide 304 so as to be movable in the Z direction. The electric motor 296 is fixed to the Z-direction slide 306.

The fine adjustment mechanism 297 adjusts the movement of the X-direction slide 302 in the X direction relative to the gripper 298 by rotating the threaded shaft 301 by means of a knob, adjusts the movement of the Y-direction slide 304 in the Y direction relative to the X-direction slide 302 by rotating the threaded shaft 303 by means of a knob, and adjusts the movement of the Z-direction slide 306 in the Z direction relative to the Y-direction slide 304 by rotating the threaded shaft 305 by means of a knob. The fine adjustment mechanism 297 is thereby adapted to finely adjust the position of the grinding wheel 295 in the X, Y, and Z directions by means of the electric motor 296. It should be noted that the fine adjustment mechanism 297 finely adjusts the position of the grinding wheel 295 such that a grinding point where the grinding wheel 295 comes into contact with that glass plate 2 to grind the peripheral edge 6 of the glass plate 2 is located on a swiveling axis B of the grinding head 291.

The grinding-head moving means 292 includes an X-direction moving device 311 for moving the grinding head 291 in the X direction relative to the glass plate 2, a Y-direction moving device 312 for moving the grinding head 291 in the Y direction relative to the glass plate 2, and a swiveling device 313 for swiveling the grinding head 291 in an R2 direction relative to the glass plate 2.

The X-direction moving device 311 uses the electric motor 246, the threaded shaft 247, the nut 248, the movable base 249, and the guide rails 250 jointly with the X-direction moving device 241, so that a detailed description thereof will be omitted.

It should be noted that a supporting plate 256*a* in this embodiment is formed as a grinding supporting table of the grinding supporting means 199.

The Y-direction moving device 312 is formed in the same way as the Y-direction moving device 242; therefore, with respect to corresponding members and corresponding arrangements, a reference character 'a' will be added in the drawings, and a detailed description thereof will be omitted.

The swiveling means 313 uses the line shaft 265, the pulley 266, the timing belt 269, the pulley 267, and the electric motor 268 jointly with the swiveling means 243, and includes a bearing 315 installed on the movable base 249; the shaft 316 held rotatably by the bearing 315 and extending in the Z direction; a bevel gear 317 installed at an upper end of the shaft 316; and a bevel gear 318 threadedly engaged with the bevel gear 317 and secured to the line shaft 265. The gripper 298 is attached to a lower end of the shaft 316.

The swiveling means 313 is arranged such that as the electric motor 268 is operated, the line shaft 265 is rotated by means of the pulley 266, the timing belt 269, and the pulley 267, which rotation rotates the shaft 316 by means of the bevel gears 317 and 318. Thus, the swiveling means 313 causes the grinding head 291 attached suspendedly to the lower end of the shaft 316 to swivel in the R2 direction.

The bend-breaking supporting means 198 includes a cut-line-forming supporting means 321 for supporting the glass plate 2 on which the main cut line 3 is to be formed by the cut-line forming means 211, as well as a push-breaking supporting means 322 for supporting the glass plate 2 which is push-broken by the push-breaking means 212.

The cut-line-forming supporting means 321 is installed on the supporting plate 256 and has the suction table 325 for sucking the glass plate 2 from its lower surface.

The suction table 325 has an area for surfacially supporting the overall lower surface of the glass plate 2. The upper surface of the table 325 for surfacially supporting the glass plate 2 is formed flatly, and a sheet (not shown) is secured on its upper surface and is thereby arranged not to cause damage to the glass plate 2. The suction table 325 is connected to a vacuum suction unit (not shown), and is arranged to suck the lower surface of the glass plate 2 by the actuation of that vacuum suction unit.

The push-breaking supporting means 322 is formed in the same way as the bend-breaking supporting means 8; therefore, with respect to corresponding members and corresponding arrangements, a reference character 'a' will be added in the drawings, and a detailed description thereof will be omitted.

The grinding supporting means 199 includes the supporting plate 256*a* serving as a grinding supporting table; a plurality of independent suction cups 327 which are arranged at desired positions on the supporting table 256*a* and are held on the supporting plate 256*a* by being attached thereto by suction, and which suck and hold the glass plate 2 by sucking the glass plate 2; and an arranging means 328 for arranging the plurality of suction cups 327, respectively, at positions corresponding to the shape of the glass plate 2 to be ground.

Since the plurality of suction cups 327 are respectively formed in the same way as the plurality of suction cups 102, a detailed description thereof will be omitted.

The arranging means 328 includes a suction-cup lifting device 331 for raising the suction cup 327; a suction-cup moving device 332 for moving the suction cup 327 raised by the suction-cup lifting device 331; and a suction-cup supporting body 333 secured to the base 251 to support the suction cups 327.

The suction-cup lifting device 331 and the suction-cup moving device 332 are respectively formed in the same way as the suction-cup lifting device 131 and the suction-cup moving device 132; therefore, with respect to corresponding members and corresponding arrangements, a reference character 'a' will be added in the drawings, and a detailed description thereof will be omitted.

The transporting means 200 includes a placing table 341 disposed on the glass-plate carrying-in end side of the glass-plate working apparatus 191; a placing table 342 disposed on the glass-plate carrying-out end side of the glass-plate working apparatus 191; four lifting devices 343 for raising the glass plate 2; and a moving device 344 for moving in the X direction the glass plate 2 raised by the lifting devices 343. The lifting devices 343 are respectively attached to a slider 205*a* by means of brackets and the like.

The placing tables 341 and 342 are respectively formed in the same way as the placing tables 149 and 150; therefore, with respect to corresponding members and corresponding arrangements, a reference character 'a' will be added in the drawings, and a detailed description thereof will be omitted.

Since the four lifting devices 343 are respectively formed in the same way as the lifting device 161, a detailed description thereof will be omitted.

The moving device 344 uses an electric motor 201*a*, a threaded shaft 202*a*, a nut 203*a*, guide rails 204*a*, and the slider 205*a* jointly with the suction-cup moving device 332, so that a detailed description thereof will be omitted.

In a case where the glass plate 2 is worked by the above-described glass-plate working apparatus 191, the glass plate 2 on the placing table 341 is first raised by the lifting devices 343, and the raised glass plate 2 is moved in the X direction by the moving device 344 so as to be positioned above the suction table 325. The glass plate 2 positioned above the suction table 325 is then lowered by the lifting devices 343 and is placed on the suction table 325. The placed glass plate 2 is sucked by the suction table 325, and the cutter wheel 225 is lowered by the actuation of the air cylinder unit 226 and is abutted against the upper surface of the sucked glass plate 2. The abutted cutter wheel 225 is moved in the X direction and the Y direction and is swiveled in the R direction by the cut-line-forming-head moving means 222, thereby forming the main cut line 3 on the glass plate 2. Next, the glass plate 2 on the suction table 325 is raised by the lifting devices 343, and the raised glass plate 2 is moved in the X direction by the moving device 344 and is positioned above an endless belt 94*a* by the moving device 344. The glass plate 2 positioned above the endless belt 94*a* is then lowered by the lifting device 343 and is placed on the endless belt 94*a*. The cutter wheel for forming an edge cut line is lowered by the edge-cut-line forming means and is abutted against the glass plate 2 on the endless belt 94*a*. The abutted cutter wheel is moved in the X direction and the Y direction by the push-breaking-head moving device 272 to form the edge cut line 4 on the glass plate 2. A push rod 21*a* is moved in the X direction and the Y direction by the push-breaking-head moving device 272, and the push rod 21*a* is lowered by the actuation of an air cylinder 22*a* to press the upper surface of the glass plate 2 on which the main cut line 3 and the edge cut line 4 has been formed, thereby push-breaking that glass plate 2 along the main cut line 3. Next, the glass plate 2 on the endless belt 94*a* is raised by lifting devices 343, and the raised glass plate 2 is moved in the X direction by the moving device 344 and is positioned above the suction cups 327 placed on the supporting plate 256*a*. The glass plate 2 positioned above the suction cups 327 is then lowered by the lifting device 343 and is placed on the suction cups 327. The lower surface of the placed glass plate 2 is sucked at a desired position by the suction cups 327 to suck and hold the glass plate 2. The grinding wheel 295 is moved in the X direction and the Y direction and is swiveled in the R2 direction by the grinding-head moving means 292, and while the grinding wheel 295 is being abutted against the peripheral edge 6 of the sucked and held glass plate 2, the grinding wheel 295 is moved along that peripheral edge 6, thereby grinding the peripheral edge 6 of the glass plate 2. Next, the ground glass plate 2 on the suction cups 327 is raised by the lifting device 343, and the raised glass plate 2 is moved in the X direction by the moving device 344 and is positioned above the placing table 342. The glass plate 2 positioned above the placing table 342 is then lowered by the lifting device 343 and is placed on the placing table 342. As for the placed glass plate 2, a drum 156*a* is rotated by the operation of an electric motor 155*a* to cause endless belts 158*a* trained between the drums 156*a* and 157*a* to travel, thereby carrying out the worked glass plate 2 on the placing table 342 from the glass-plate working apparatus 191. After the ground glass plate 2 is transported from on the suction cups 327 onto the placing table 342 by the transporting means 200, the suction cups 327 on the supporting plate 256*a* or the suction-cup supporting body 333 are placed at positions on the supporting plate 256*a* corresponding to the shape of the glass plate 2 of a different shape to be ground next or on the suction-cup supporting body 333, in the same way as described above.

Figure 15:
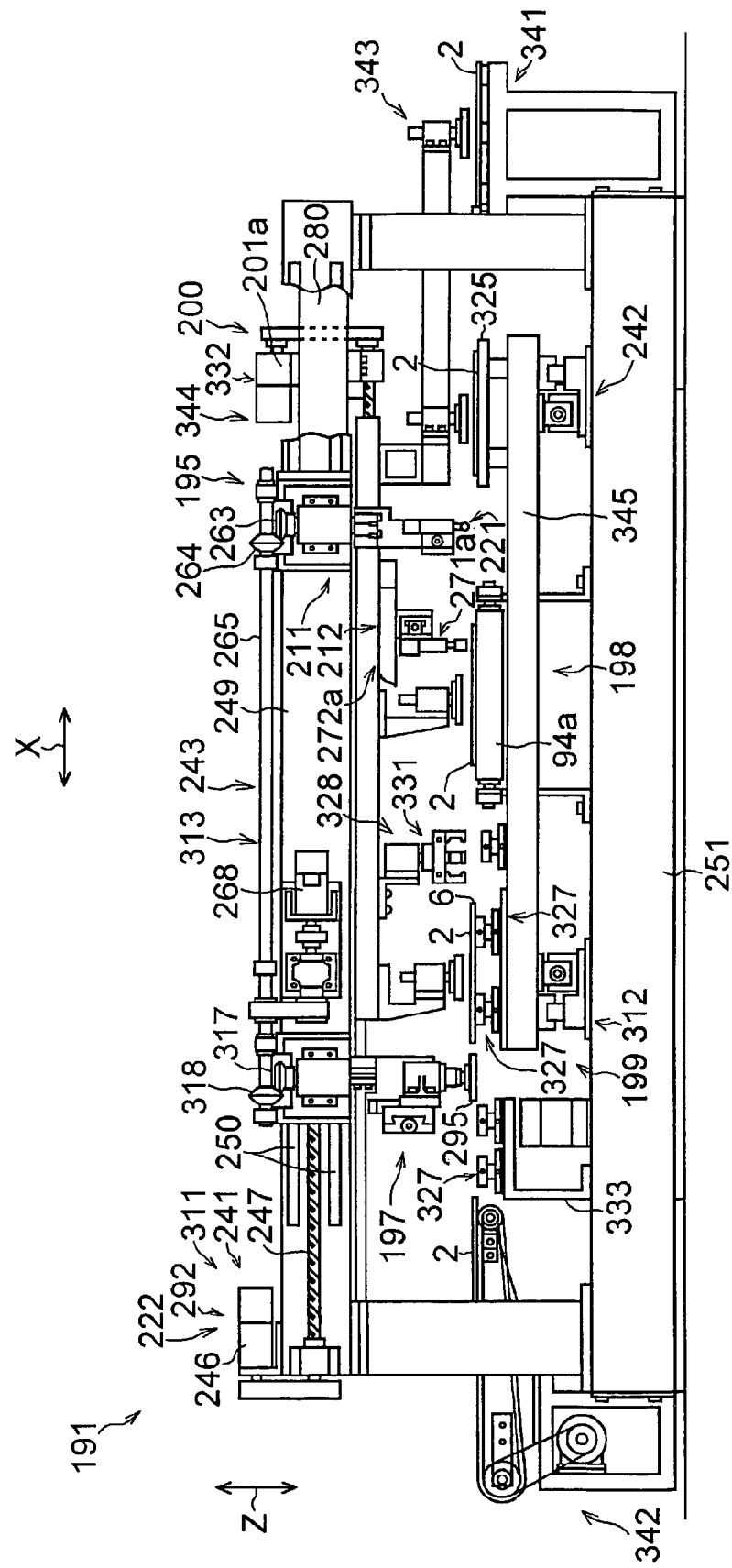
FIG. 15 is an explanatory front elevational view of a modification of the embodiment shown in FIG. 10.

It should be noted that the working apparatus 191 may be constructed by including, instead of the supporting plates 256 and 256*a*, a single supporting plate 345 to which the suction table 325 is secured and which is formed in such a manner as to extend in the X direction, as shown in FIG. 15. In this case, it suffices if the glass plates 2 respectively sucked and held by the suction table 325 and the suction cups 327 are synchronously moved in the Y direction by the operation of the electric motors 252 and 252*a*.

With the glass-plate working apparatus 191 as well, since the suction cups 327 are adapted to be releasably held on the grinding supporting table 256*a* or 345, the suction cups 327 are not restrained by the grinding supporting table 256*a* or 345 and can be arranged on and fixed to the supporting table 256a or 345 at optimal positions for sucking and fixing the glass plate 2 in correspondence with the different shape of the glass plate 2.

The invention claimed is:

1. A glass-plate working apparatus comprising:
    grinding means for grinding a peripheral edge of a glass plate;
    grinding supporting means for supporting the glass plate whose peripheral edge is to be ground by said grinding means; and
    transporting means for transporting said glass plate in and out said grinding supporting means by a linear movement thereof crossing above said grinding supporting means,
    wherein said grinding supporting means includes a grinding supporting table, a plurality of suction cups which are held on said grinding supporting table by being attached by suction to said grinding supporting table and suck and hold the glass plate by sucking the glass plate whose peripheral edge is to be ground, said plurality of suction cups being separated from each other, and arranging means for disposing said plurality of suction cups, respectively, at positions corresponding to a shape of the glass plate to be ground, and
    wherein said arranging means includes a suction-cup supporting body for supporting said suction cups separately from said grinding supporting table, a suction-cup lifting device for raising the suction cup which is supported by said grinding supporting table or the suction-cup supporting body, and a suction-cup moving device which is adapted to move said suction cup raised by said suction-cup lifting device from on said grinding supporting table onto said suction-cup supporting body or from on said suction-cup supporting body onto said grinding supporting table in correspondence with the shape of the glass plate whose peripheral edge is to be ground by said grinding means,
    wherein said transporting means includes one lifting device for raising the glass plate to be carried in and another lifting device for raising the glass plate on the suction cup to be carried out,
    wherein said transporting means and said suction-cup moving device share a slider to which said suction-cup lifting device, said one lifting device and said other lifting device are attached, and which is linearly movable in one direction,
    wherein said grinding supporting table of said grinding supporting means is movable in the different direction from said one direction in which said slider is linearly movable,
    wherein said arranging means is adapted to move said suction-cup lifting device by a linear movement of said slider in said one direction and a movement of said grinding supporting table of said grinding supporting means so as to be capable of arranging said suction-cup lifting device at a position corresponding to a shape of glass plate on said grinding supporting table,
    wherein said suction cup includes a glass plate sucking portion whose upper surface is covered with an elastic member for abutting against the glass plate, an abutment body for abutting against said grinding supporting table having a recessed surface, a connecting portion for connecting said abutment body and said glass plate sucking portion, a first communicating hole for communicating with a first opening opening on a peripheral surface of the abutment body and a second opening opening on an upper surface of the glass plate sucking portion, and a second communicating hole for communicating with a third opening opening on the peripheral surface of the abutment body and a fourth opening opening on the recessed surface,
    wherein each of said plurality of suction cups is adapted to suck and hold the lower surface of the glass plate through the second opening and to be suckingly fixed to the supporting plate through the fourth opening.

2. The glass-plate working apparatus according to claim 1, wherein said arranging means is adapted to dispose said suction cups at positions corresponding to a shape of the glass plate in association with said transporting means and said grinding supporting means.

3. The glass-plate working apparatus according to claim 1, wherein said suction cup has an annular abutment surface for abutment against said grinding supporting table and a recessed surface which is recessed with respect to said grinding supporting table, and is adapted to be attached by suction to said grinding supporting table through an opening in the recessed surface.

4. The glass-plate working apparatus according to claim 3, wherein said suction cup includes a disk body having the annular abutment surface and the recessed surface; a cylindrical body whose upper surface is covered with an elastic member for abutment against a lower surface of the glass plate; and a connecting shaft which connects said disk body and said cylindrical body, said suction cup being adapted to suck the glass plate through an opening in an upper surface of said elastic member and to be attached by suction to said grinding supporting table through the opening in the recessed surface of said disk body.

5. A glass-plate working apparatus comprising:
    grinding means for grinding a peripheral edge of a glass plate;
    grinding supporting means for supporting the glass plate whose peripheral edge is to be ground by said grinding means; and
    transporting means for transporting said glass plate in and out said grinding supporting means by a linear movement thereof crossing above said grinding supporting means,
    wherein said grinding supporting means includes a grinding supporting table, a plurality of suction cups which are held on said grinding supporting table by being attached by suction to said grinding supporting table and suck and hold the glass plate by sucking the glass plate whose peripheral edge is to be ground, said plurality of suction cups being separated from each other, and arranging means for disposing said plurality of suction cups, respectively, at positions corresponding to a shape of the glass plate to be ground, and
    wherein said arranging means includes a suction-cup lifting device for raising the suction cup which is supported by said grinding supporting table, and a suction-cup moving device which is adapted to move said suction cup raised by said suction-cup lifting device in correspondence with the shape of the glass plate whose peripheral edge is to be ground by said grinding means,
    wherein said transporting means includes one lifting device for raising the glass plate to be carried in and another lifting device for raising the glass plate on the suction cup to be carried out,
    wherein said transporting means and said suction-cup moving device share a slider to which said suction-cup lifting device, said one lifting device and said other lifting device are attached, and which is linearly movable in one direction, wherein said grinding supporting table of said grinding supporting means is movable in the different direction from said one direction in which said slider is linearly movable, wherein said arranging means is adapted to move said suction-cup lifting device by a linear movement of said slider in said one direction and a movement of said grinding supporting table of said grinding supporting means so as to be capable of arranging said suction-cup lifting device at a position corresponding to a shape of glass plate on said grinding supporting table, wherein said suction cup includes a glass plate sucking portion whose upper surface is covered with an elastic member for abutting against the glass plate; a disk body for abutting against said grinding supporting table having a recessed surface; a connecting portion for connecting said disk body and said glass plate sucking portion, a first communicating hole for communicating with a first opening opening on a peripheral surface of the disk body and a second opening opening on an upper surface of the glass plate sucking portion, and a second communicating hole for communicating with a third opening opening on the peripheral surface of the disk body and a fourth opening opening on the recessed surface, wherein each of said plurality of suction cups is adapted to suck and hold the lower surface of the glass plate through the second opening and to be sucklingly fixed to the support plate through the fourth opening.

6. A glass-plate working apparatus comprising:

grinding means for grinding a peripheral edge of a glass plate;

grinding supporting means for supporting the glass plate whose peripheral edge is to be ground by said grinding means; and transporting means for transporting said glass plate in and out said grinding supporting means by a linear movement thereof crossing above said grinding supporting means, wherein said grinding supporting means includes a grinding supporting table, a plurality of suction cups which are held on said grinding supporting table by being attached by suction to said grinding supporting table and suck and hold the glass plate by sucking the glass plate whose peripheral edge is to be ground, said plurality of suction cups being separated from each other, and arranging means for arranging said plurality of suction cups, respectively, at positions corresponding to a shape of the glass plate to be ground, wherein said arranging means is composed of the grinding supporting table and the suction-cup lifting device attached to said transporting means for transporting said glass plate in and out, wherein said suction cup includes a glass plate sucking portion whose upper surface is covered with an elastic member for abutting against the glass plate, an abutment body for abutting against said grinding supporting table having a recessed surface, a connecting portion for connecting said abutment body and said glass plate sucking portion, a first communicating hole for communicating with a first opening opening on a peripheral surface of the abutment body and a second opening opening on an upper surface of the glass plate sucking portion, and a second communicating hole for communicating with a third opening opening on the peripheral surface of the abutment body and a fourth opening opening on the recessed surface, wherein each of said plurality of suction cups is adapted to suck and hold the lower surface of the glass plate through the second opening and to be suckingly fixed to the supporting plate through the fourth opening.

* * * * *